United States Patent
Butler

(10) Patent No.: US 11,766,807 B2
(45) Date of Patent: Sep. 26, 2023

(54) APPARATUSES AND SYSTEMS FOR AND METHODS OF GENERATING AND PLACING ZERO-SLUMP-PUMPABLE CONCRETE

(71) Applicant: Michael George Butler, Fort Bragg, CA (US)

(72) Inventor: Michael George Butler, Fort Bragg, CA (US)

( * ) Notice: Subject to any disclaimer, the term of this patent is extended or adjusted under 35 U.S.C. 154(b) by 441 days.

(21) Appl. No.: 16/469,623

(22) PCT Filed: Jan. 16, 2018

(86) PCT No.: PCT/IB2018/000301
§ 371 (c)(1),
(2) Date: Jun. 13, 2019

(87) PCT Pub. No.: WO2018/130913
PCT Pub. Date: Jul. 19, 2018

(65) Prior Publication Data
US 2019/0308342 A1      Oct. 10, 2019

Related U.S. Application Data

(60) Provisional application No. 62/446,443, filed on Jan. 15, 2017, provisional application No. 62/446,444, filed on Jan. 15, 2017.

(51) Int. Cl.
*B28C 5/06* (2006.01)
*E04G 21/02* (2006.01)
(Continued)

(52) U.S. Cl.
CPC .............. *B28C 5/06* (2013.01); *E04G 21/025* (2013.01); *E04G 21/0436* (2013.01);
(Continued)

(58) Field of Classification Search
CPC ....... B28C 5/06; B28C 5/0875; B28C 7/0418; B28C 7/163; E04G 21/025;
(Continued)

(56) References Cited

U.S. PATENT DOCUMENTS

| 998,762 A | * | 7/1911 | Faller | ...................... B28C 5/026 366/11 |
| 2,075,867 A | * | 4/1937 | Sampel | ................... E04F 21/12 366/11 |

(Continued)

FOREIGN PATENT DOCUMENTS

| AT | 360737 | 1/1981 |
| CN | 1276752 | 12/2000 |

(Continued)

OTHER PUBLICATIONS

PCT/IB2018/00301 Notification of Decision on Protest or Declaration That Protest Considered Not to Have Been Made, Nov. 9, 2018.
(Continued)

*Primary Examiner* — Charles Cooley
(74) *Attorney, Agent, or Firm* — Larry Williams

(57) ABSTRACT

Methods, systems, and devices, are developed for in-situ placement of a concrete mix that can have the thixotropy to hold vertical dimension without containment, while maintaining pliability to be pumped into place and manipulated to a desired shape, and can be combined with concrete set accelerators, allowing subsequent layers of this concrete mix to be continuously stacked in place to build tall walls and such without the use of forms. Concrete without these special properties is pumped toward the point of placement where it is modified by injecting and mixing, into that line of pumped concrete, an admixture containing thixotropes, thickeners and/or set accelerators or other modifiers to provide these properties and other improvements. This (Continued)

method allows conventional plant batching with commonly available constituent materials for batching an economical concrete that is delivered to a jobsite and then is pumped most of the way to a point of placement.

21 Claims, 10 Drawing Sheets

(51) Int. Cl.
    *E04G 21/04* (2006.01)
    *B28B 1/16* (2006.01)
    *B28C 5/08* (2006.01)
    *B28C 7/04* (2006.01)
    *B28C 7/16* (2006.01)
    *E04G 21/10* (2006.01)
    *B01F 25/314* (2022.01)
    *B01F 25/431* (2022.01)
    *B01F 25/00* (2022.01)

(52) U.S. Cl.
    CPC ..... *B01F 25/3141* (2022.01); *B01F 25/31423* (2022.01); *B01F 25/4311* (2022.01); *B01F 25/4316* (2022.01); *B01F 25/431971* (2022.01); *B01F 2025/931* (2022.01); *B28B 1/16* (2013.01); *B28C 5/0875* (2013.01); *B28C 7/0418* (2013.01); *B28C 7/163* (2013.01); *E04G 21/10* (2013.01)

(58) Field of Classification Search
    CPC ... E04G 21/0436; E04G 21/10; B01F 5/0473; B01F 5/048; B01F 5/0611; B01F 5/0618; B01F 2005/0091; B01F 2005/0636; B01F 25/3141; B01F 25/31423; B01F 25/4311; B01F 25/4316; B01F 25/431971; B01F 2025/931; B28B 1/16; C04B 2111/00146; C04B 40/0028
    USPC ...................................................... 366/11, 2
    See application file for complete search history.

(56) References Cited

U.S. PATENT DOCUMENTS

| | | | | |
|---|---|---|---|---|
| 2,661,194 A | * | 12/1953 | Katovsich | E04F 21/12 366/11 |
| 2,700,535 A | * | 1/1955 | Harrington | E04F 21/12 366/11 |
| 4,046,357 A | * | 9/1977 | Twitchell | B05B 7/149 366/27 |
| 4,298,288 A | * | 11/1981 | Weisbrod | B28C 9/0454 366/11 |
| 4,390,371 A | | 6/1983 | Cornwell | |
| 4,919,397 A | | 4/1990 | King | |
| 5,141,363 A | * | 8/1992 | Stephens | C04B 28/02 405/150.2 |
| 5,203,629 A | | 4/1993 | Valle et al. | |
| 5,419,632 A | * | 5/1995 | Stephens | E04G 21/0472 366/51 |
| 5,554,392 A | | 9/1996 | Gray | |
| 5,645,375 A | * | 7/1997 | Stephens | C04B 28/04 405/154.1 |
| 5,758,967 A | | 6/1998 | King | |
| 5,795,060 A | * | 8/1998 | Stephens | B01F 35/883 366/8 |
| 5,803,596 A | * | 9/1998 | Stephens | A62C 5/02 261/DIG. 26 |
| 5,803,665 A | * | 9/1998 | Stephens | C04B 40/0028 405/184.5 |
| 5,829,874 A | * | 11/1998 | Breeding | B01F 31/42 366/120 |
| 5,895,116 A | | 4/1999 | Kreinheder | |
| 6,065,859 A | * | 5/2000 | Breeding | B28B 1/0935 366/121 |
| 6,155,708 A | * | 12/2000 | Lindley | B06B 1/16 366/123 |
| 6,167,912 B1 | * | 1/2001 | Stephens | F16L 55/175 264/269 |
| 6,190,448 B1 | | 2/2001 | Langenohl | |
| 7,766,537 B2 | * | 8/2010 | Gembala | B28C 7/02 366/10 |
| 8,172,937 B2 | | 5/2012 | Masloff et al. | |
| 8,621,817 B1 | | 1/2014 | Kreizinger | |
| 8,959,862 B1 | | 2/2015 | Kreizinger | |
| 9,091,028 B1 | * | 7/2015 | McCary, Sr. | E01C 19/281 |
| 9,221,022 B2 | | 12/2015 | Glanville | |
| 9,359,778 B1 | | 6/2016 | Kreizinger | |
| 9,416,052 B2 | | 8/2016 | Feldman et al. | |
| 2007/0271924 A1 | | 11/2007 | Daguenet | |
| 2007/0284104 A1 | | 12/2007 | Beckman | |
| 2009/0314666 A1 | | 12/2009 | Reif et al. | |
| 2013/0170314 A1 | | 7/2013 | Hansson | |
| 2013/0272083 A1 | | 10/2013 | Thoma | |
| 2015/0298075 A1 | | 10/2015 | Glanville | |
| 2016/0207701 A1 | | 7/2016 | Ernest et al. | |
| 2017/0003029 A1 | | 1/2017 | Mook et al. | |
| 2018/0057405 A1 | | 3/2018 | Al-Chaar et al. | |
| 2018/0071949 A1 | | 3/2018 | Giles | |
| 2019/0194072 A1 | | 6/2019 | Esnault et al. | |
| 2019/0308342 A1 | * | 10/2019 | Butler | C04B 40/0028 |
| 2022/0088822 A1 | * | 3/2022 | Butler | B28B 1/16 |
| 2022/0106230 A1 | * | 4/2022 | Markandeya | C04B 14/104 |
| 2022/0196000 A1 | * | 6/2022 | Butler | B28C 5/026 |

FOREIGN PATENT DOCUMENTS

| | | |
|---|---|---|
| CN | 101466811 | 6/2009 |
| CN | 104016641 A | 9/2014 |
| CN | 204354263 | 5/2015 |
| CN | 105018055 | 11/2015 |
| CN | 104016641 B | 4/2016 |
| CN | 105605366 B | 7/2017 |
| EP | 0188471 B1 | 11/1989 |
| EP | 1514592 A1 * | 3/2005 |
| EP | 3260258 B1 | 6/2019 |
| FR | 2732263 | 10/1996 |
| WO | 2013135935 A1 | 3/2013 |
| WO | 2013135935 A1 | 9/2013 |
| WO | 2017221058 A1 | 12/2017 |
| WO | 2018130913 A2 | 7/2018 |
| WO | WO-2018130913 A2 * | 7/2018 ......... C04B 40/0028 |

OTHER PUBLICATIONS

PCT/IB2018/00301 International Search Report, dated Nov. 29, 2018.
PCT/IB2018/00301 PCT Recordation of Search History, Nov. 29, 2018.
PCT/IB2018/00301 Written Opinion of the International Searching Authority, dated Nov. 29, 2018.
PCT/IB2018/00301 International Search Report, dated Nov. 29, 2018. Reference: Discount Equipment Mayco C30-HDZ concrete pump.
PCT/IB2018/00301 International Search Report, dated Oct. 4, 2018.
PCT/IB2018/00301 PCT Recordation of Search History, Oct. 4, 2018.
PCT/IB2018/00301 Written Opinion of the International Searching Authority, dated Oct. 4, 2018.
"Pumpability of Thixcon Ken Kreizinger", Analysis letter by Daniel M. McCoy, Feb. 15, 2019.
Freek Bos, Rob Wolfs, Zeeshan Ahmed & Theo Salet (2016) Additive manufacturing of concrete in construction: potentials and challenges of 3D concrete printing, Virtual and Physical Prototyping, 11:3, 209-225, DOI: 10.1080/17452759.2016.1209867.
Corresponding EP Application 18738912.7 Office Action Reply, dated Mar. 18, 2020.
Corresponding EP Application 18738912.7 Partial Search Report, dated Jan. 15, 2021.

(56) References Cited

OTHER PUBLICATIONS

Corresponding EP Application 18738912.7 Office Action Reply dated Mar. 17, 2021.
Corresponding EP Application 18738912.7 Extended Search Report dated May 10, 2021.
Corresponding EP Application 18738912.7 Office Action Reply dated Dec. 1, 2021.
Corresponding CN Application 2018800057843 First Office Action dated Apr. 26, 2021.
Corresponding CN Application 2018800057843 First Office Action dated Apr. 26, 2021, English translation.
Steven Callaghan, World's Largest 3D Printed Building Made with Real Concrete Is Now Open, https://concretetimes.online/worlds-largest-3d-printed-building-made-with-real-concrete-is-now-open/ Jan. 11, 2022. Information on efforts by others back to at least 2017.
Paul Hanaphy, CEMEX and COBOD help GUtech build "world's largest 3D printed 'real concrete' building" in Oman, https://3dprintingindustry.com/news/cemex-and-cobod-help-gutech-build-worlds-largest-3d-printed-real-concrete-building-in-oman-201905/. Information on efforts by others back to at least 2017.

* cited by examiner

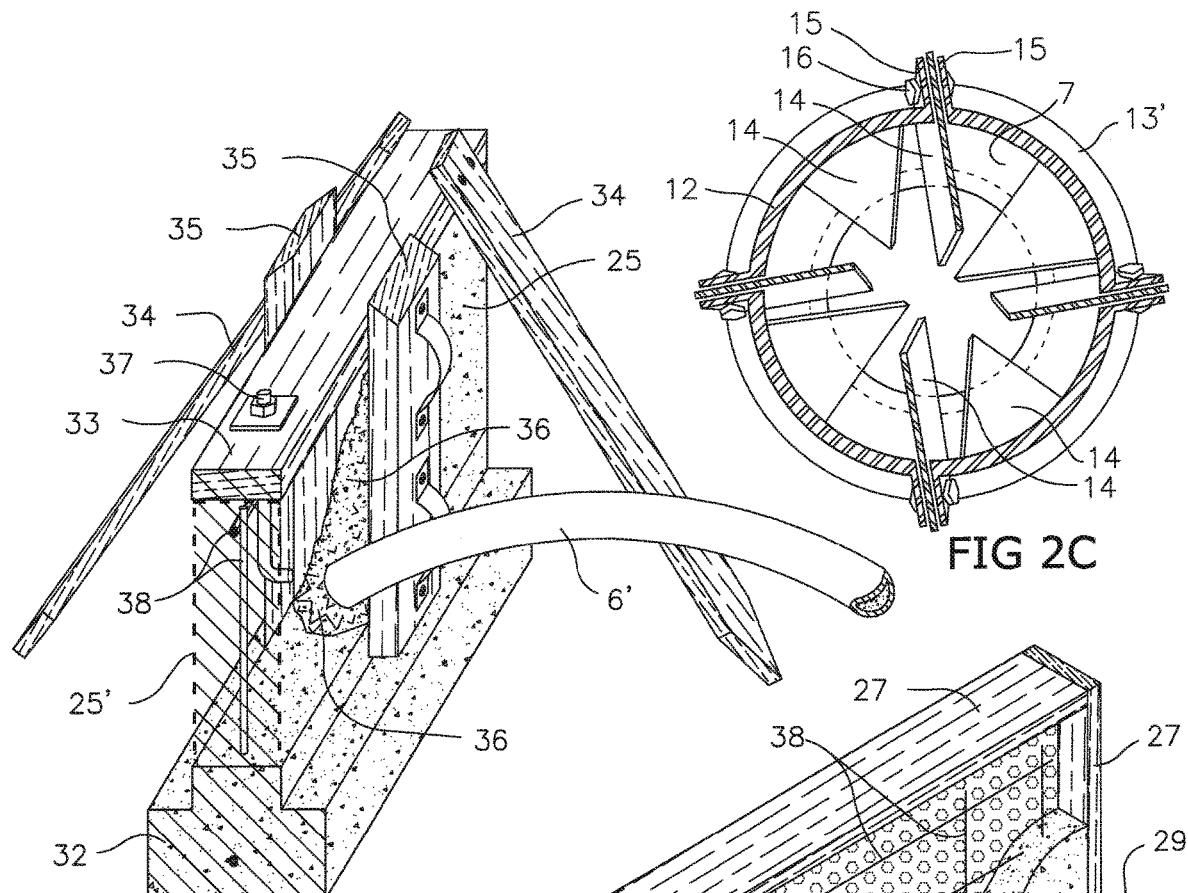
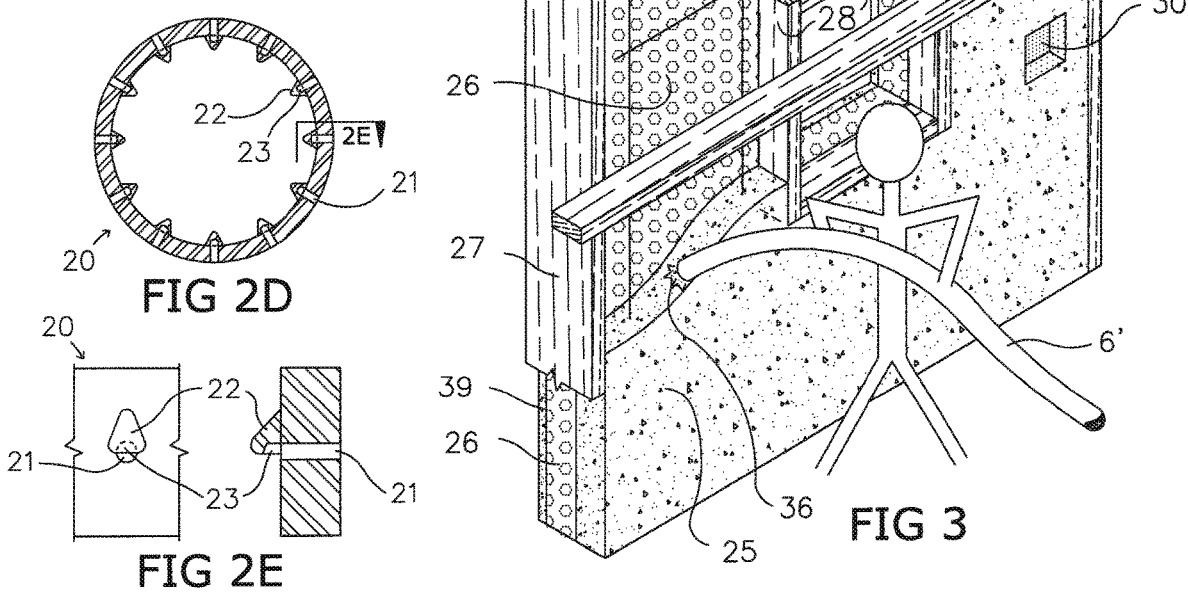

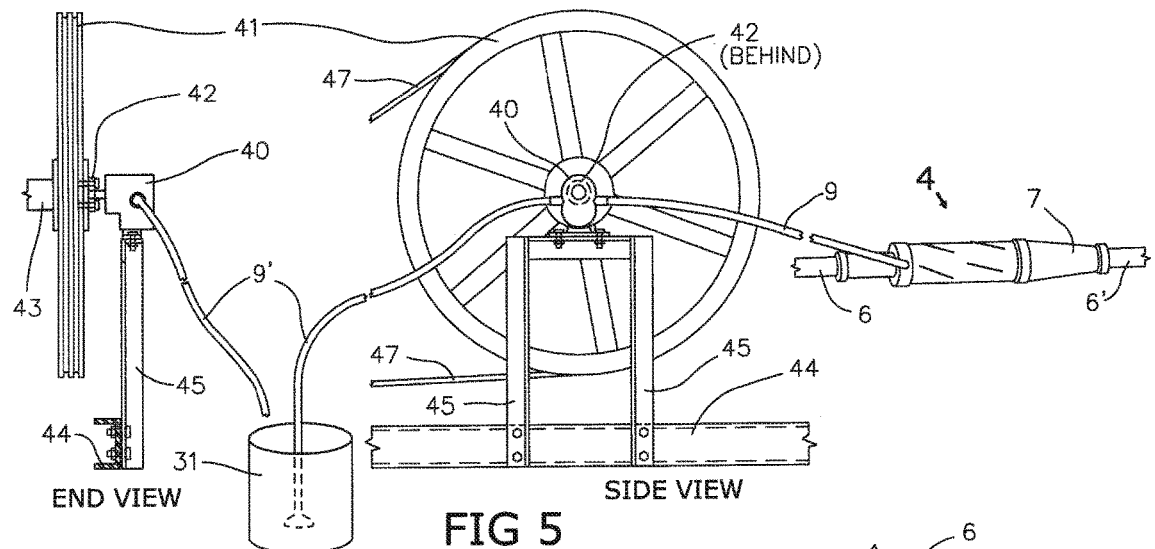
FIG 5
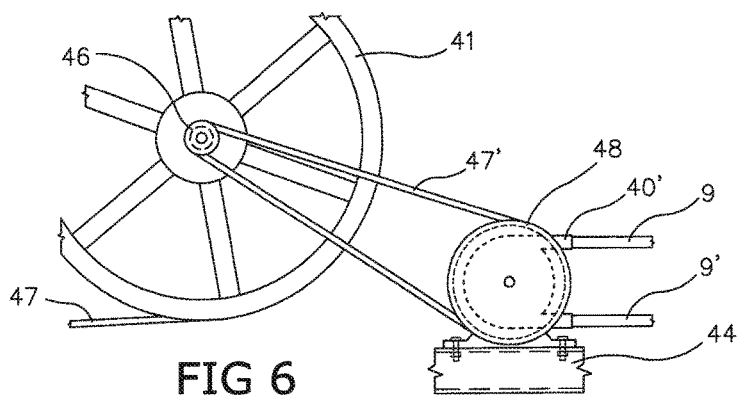
FIG 6
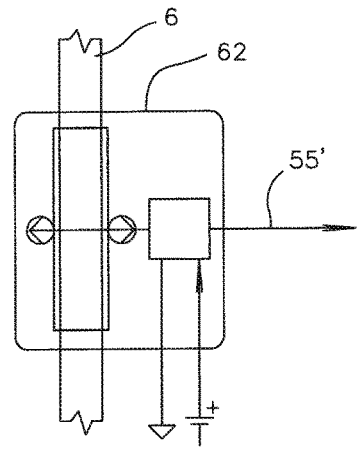
FIG 7B
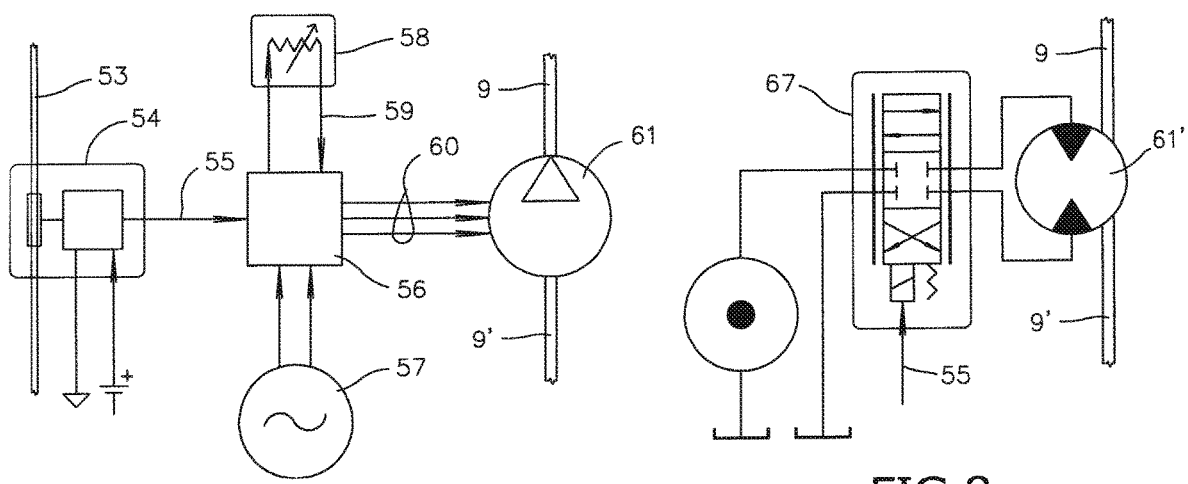
FIG 7A
FIG 8

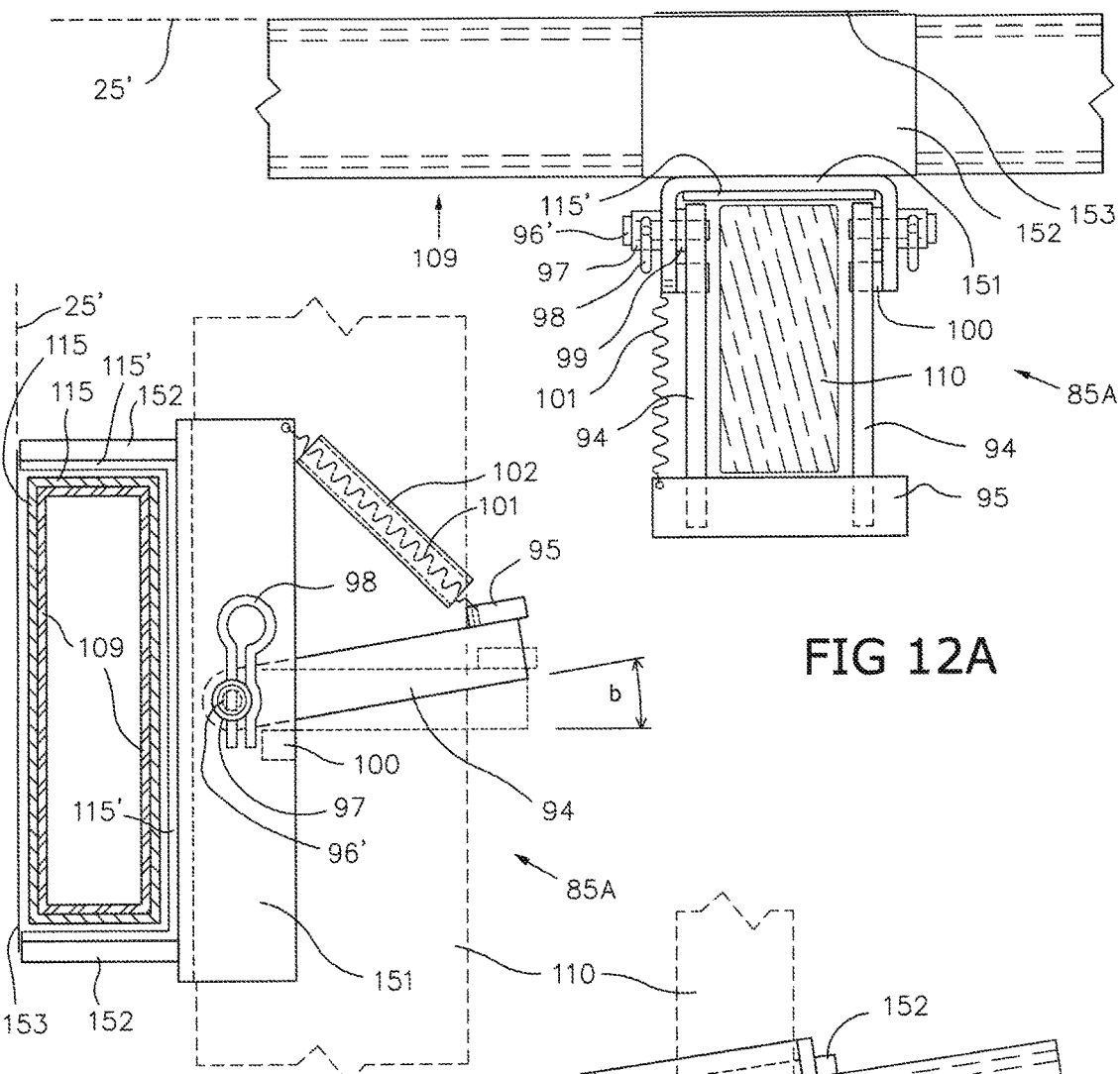
FIG 12A
FIG 12B
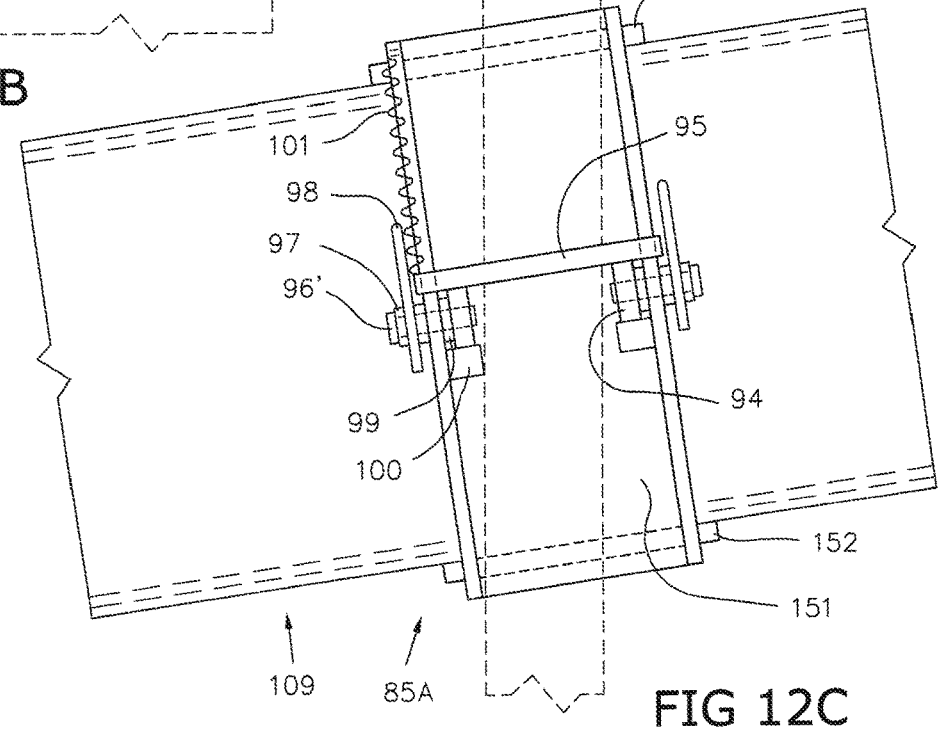
FIG 12C

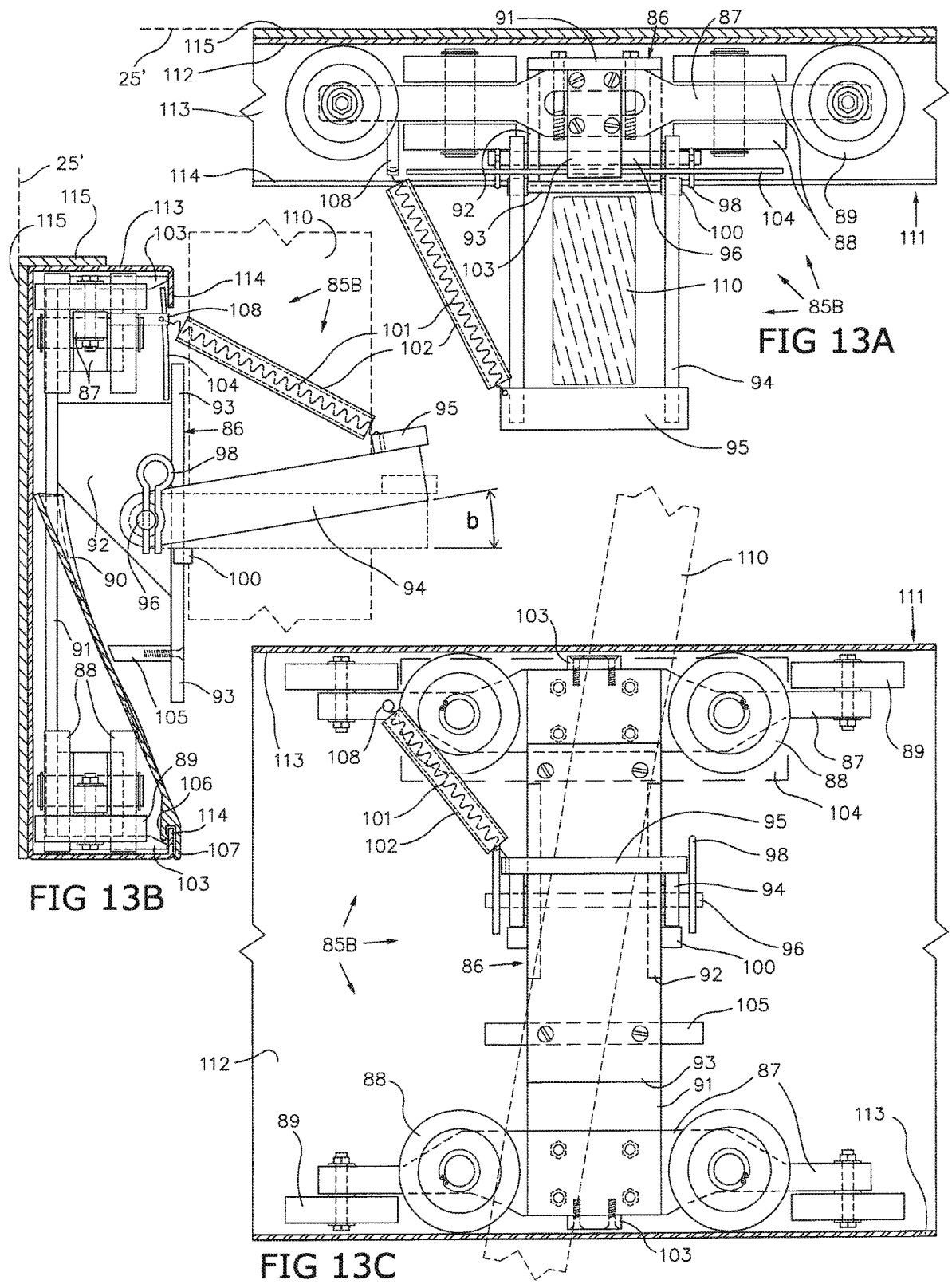

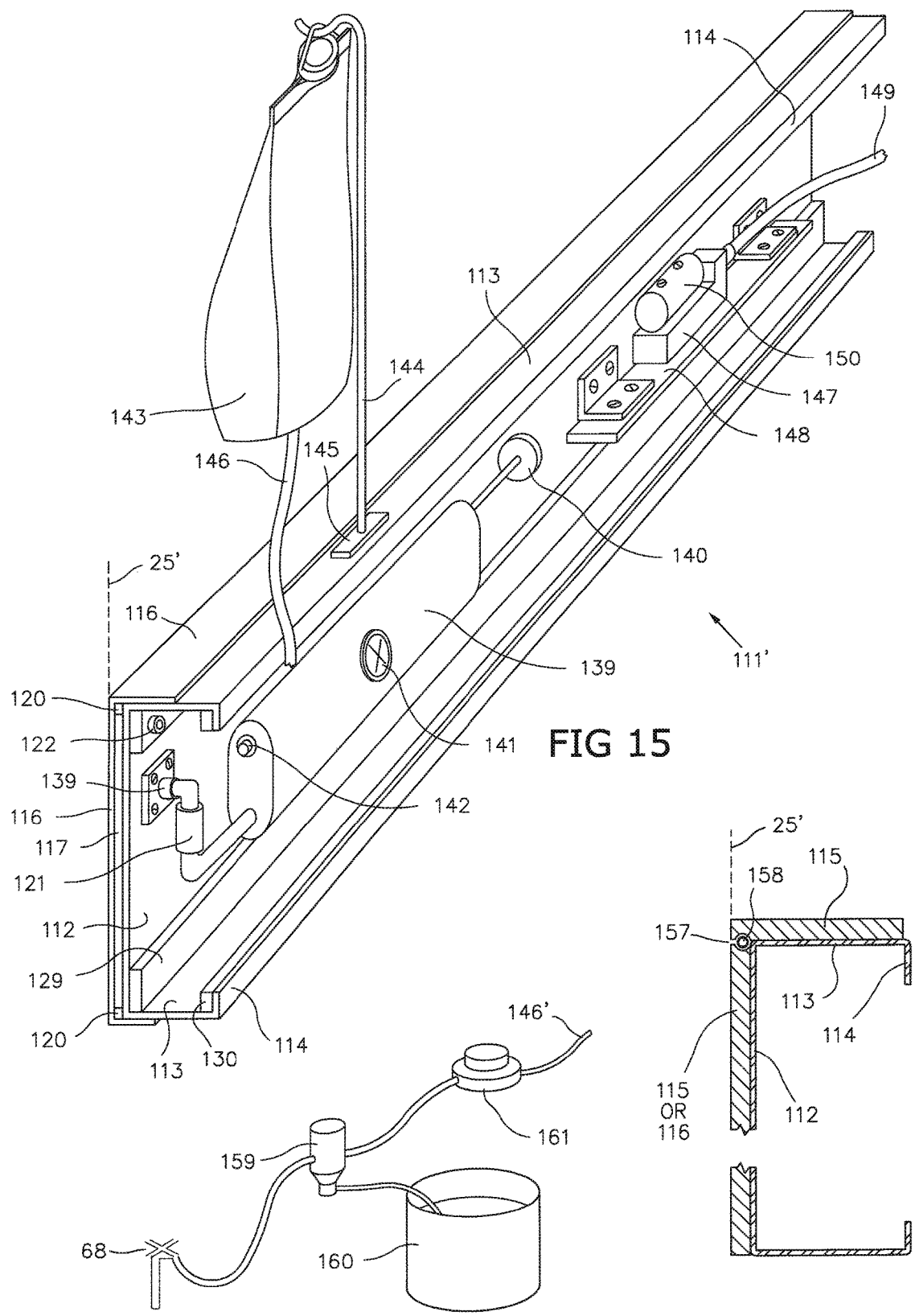

APPARATUSES AND SYSTEMS FOR AND METHODS OF GENERATING AND PLACING ZERO-SLUMP-PUMPABLE CONCRETE

CROSS-REFERENCE TO RELATED APPLICATIONS

The present application claims benefit of U.S. Patent Application Ser. 62/446,443, titled "Method and System using a Volumetric Concrete Mixer to Make Zero-Slump-Pumpable Concrete," to Michael George BUTLER, filed Jan. 15, 2017 and U.S. Patent Application Ser. 62/446,444, titled "Methods and Devices to Make Zero-Slump-Pumpable Concrete," to Michael George BUTLER, filed Jan. 15, 2017. The contents of all of these applications and patents are incorporated herein in their entirety by this reference.

BACKGROUND

One or more aspects of the present invention pertain to the technical field of construction. More particularly, one or more aspects of the present invention pertain to the field of structural concrete cast in-situ for walls and such. More particularly the present invention pertains to creating and using a structural concrete mix.

SUMMARY

One aspect of the present invention pertains to methods of making zero slump pumpable concrete. Another aspect of the present invention pertains to apparatuses for placing and using zero slump pumpable concrete. Another aspect of the present invention pertains to systems for forming concrete structures.

It is to be understood that the invention is not limited in its application to the details of construction and to the arrangements of the components set forth in the following description.

The invention is capable of other embodiments and of being practiced and carried out in various ways. In addition, it is to be understood that the phraseology and terminology employed herein are for the purpose of description and should not be regarded as limiting.

BRIEF DESCRIPTION OF THE DRAWINGS

FIGS. 2A through 2E show various views of the inline fluid injection and mixing device:

FIG. 2A is an isometric view.

FIG. 2B is a longitudinal section, cut along 2 of the mixing vanes.

FIG. 2C is a cross section cut through the first set of vanes.

FIG. 2D is a section of the admixture ring cut at the supply orifices.

FIG. 2E is a section of the admixture ring showing an injection shield.

FIG. 3 shows the placement and geometry definition of the zero-slump-pumpable concrete to create an insulated wall.

FIG. 4 shows a means of defining the vertical surfaces of a foundation wall built with the zero-slump-pumpable concrete.

FIG. 5 shows a direct-drive system for proportional-metering of admixture flow rate FIG. 6 shows a belt drive option for proportional-metering of admixture flow rate FIG. 7A shows an electronic schematic for linking admixture flow rate with hydraulic fluid flow rate.

FIG. 7B shows an electronic schematic for linking admixture flow rate with concrete flow rate.

FIG. 8 shows a hydraulic schematic for using a hydraulically-powered admixture pump.

FIG. 9A is an isometric view.

FIG. 9B is a longitudinal section.

FIG. 9C is a cross section.

FIG. 12 shows specifics of a geometry definition system that uses a box beam with external sliding guidance.

FIG. 12A is a top view.

FIG. 12B is a side and section view.

FIG. 12C is a face view.

FIG. 13 shows specifics of a geometry definition system that uses a channel beam with internal roller bearing guidance.

FIG. 13A is a top view with obscuring materials removed.

FIG. 13B is a side and section view.

FIG. 13C is a face view with obscuring materials removed.

FIG. 14 shows specifics of a geometry definition system that uses a channel beam with internal sliding guidance.

FIG. 14A is a side and section view.

FIG. 14B is a face view with obscuring materials removed.

FIG. 14C is a section view looking down.

FIG. 15 shows variations on reservoirs for form release agent and an oscillator.

FIG. 16A shows a system providing a means to continuously apply form release to a surface.

FIG. 16B shows a means of using a modified water supply as source of a form release agent.

Figure 1:
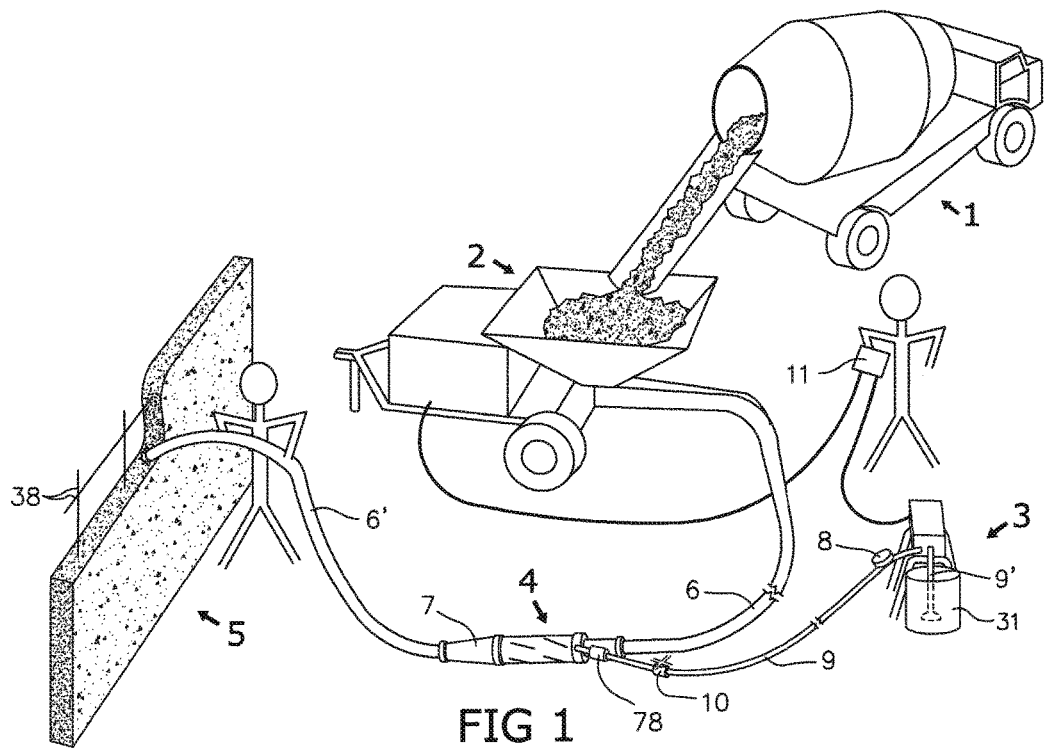
FIG. 1 shows a system according to one or more embodiments of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION

For the following defined terms, these definitions shall be applied, unless a different definition is given in the claims or elsewhere in this specification. All numeric values are herein defined as being modified by the term "about," whether or not explicitly indicated. The term "about" generally refers to a range of numbers that a person of ordinary skill in the art would consider equivalent to the stated value to produce substantially the same properties, function, result, etc. A numerical range indicated by a low value and a high value is defined to include all numbers subsumed within the numerical range and all subranges subsumed within the numerical range. As an example, the range 10 to 15 includes, but is not limited to, 10, 10.1, 10.47, 11, 11.75 to 12.2, 12.5, 13 to 13.8, 14, 14.025, and 15.

"Admixture" is a term of art in concrete construction that has the meaning of an additive that is typically used in minimal doses to affect the concrete properties. In this application it has a specific meaning to describe the additive compositions utilized to modify the concrete to provide the zero-slump-pumpable properties. These modifications include use of thixotropes for an improved rheology allowing placement of the concrete without forms, whereby it has a high static shear with shear thinning upon displacement, beyond what cement can provide, and to provide thickening in general as required for achieving zero-slump, and set-accelerators as preferred to allow rapid stacking of the concrete.

"Liquid-mixture" is a term used to describe the entire liquid supplied to the concrete mix in lieu of water, to impart the same properties described above, in the context of batching concrete with a volumetric mixing process where the water for that concrete is replaced entirely with the liquid-mixture.

The term "pumpable" as used herein is defined as the ability of confined concrete to flow under pressure while maintaining its initial properties.

The term "zero slump" as used herein is essentially as defined by the ASTM for concrete.

Concrete according to one or more embodiments of the present invention is termed "zero-slump-pumpable" concrete, to distinguish it from "no-slump" or "zero-slump" concrete which generally means a very stiff concrete mix that primarily includes less water as a means to create that stiffness. Concrete termed no-slump or zero-slump is intended for placement methods such as slip forming, dry packing, roller forming, or extruding; where attempting to pump the mix with a common concrete or grout pump is out of the question. However this use of the term "zero-slump-pumpable" refers to a new type of a concrete that can be pumped with a low-powered concrete or grout pump, yet is sufficiently stiff as it initially comes out of the pump hose to be placed in subsequent layers, building a vertical dimension of concrete without the need of forms; and is also sufficiently pliable and workable so that irregularities in the just-placed wet concrete can be corrected manually, allowing consistent placement with trued surfaces. "Zero-slump-pumpable" concrete as used herein is relatively soft and resembles a fluid having the consistency (i.e. viscosity), of something akin to what comes out of a soft ice cream dispenser. It is preferably highly thixotropic having high shear strength in the static condition, but it responds well to dynamic forces with significant shear thinning allowing manipulation. It behaves as if it were a lighter weight substance even though it is normal weight concrete and it retains its shape, and quickly solidifies sufficiently to support additional layers placed over it.

According to one or more embodiments of the present invention, the zero slump pumpable concrete that can be pumped with a low powered concrete or grout pump can be pumped using a concrete or grout pump having a maximum power capacity of 50 horsepower or less.

According to one or more embodiments of the present invention, the zero slump pumpable concrete that can be pumped with a low powered concrete or grout pump can be pumped using a concrete or grout pump having a maximum power capacity of 75 horsepower or less such as the Mayco C30HDG Concrete Pump which has an engine output of 65 hp (51 kW).

According to one or more embodiments of the present invention, the zero slump pumpable concrete that can be pumped with a low powered concrete or grout pump can be pumped using a concrete or grout pump having a maximum power capacity of 100 horsepower or less such as the Mayco C30HDG Concrete Pump which has an engine output of 65 hp (51 kW).

According to one or more embodiments of the present invention, the zero slump pumpable concrete that can be pumped with a low powered concrete or grout pump can be pumped using a concrete or grout pump having a maximum concrete pressure performance of 600 pounds per square inch or less such as the Mayco C30HDG Concrete Pump which has a maximum concrete pressure performance of 500 pounds per square inch (35 bar).

Various embodiments of the present invention may include any of the described features, alone or in combination. Other features and/or benefits of this disclosure will be apparent from the following description.

The order of execution or performance of the operations or the processes in embodiments of the invention illustrated and described herein is not essential, unless otherwise specified. That is, the operations or the processes may be performed in any order, unless otherwise specified, and embodiments of the invention may include additional or fewer operations or processes than those disclosed herein. For example, it is contemplated that executing or performing a particular operation or process before, simultaneously with, contemporaneously with, or after another operation or process is within the scope of aspects of the invention.

The following patents are hereby incorporated by reference herein, in their entirety, for all purposes: U.S. Pat. Nos. 9,061,940, 9,266,969, 9,260,734, 9,238,591, 9,802,864, 9,643,888, 9,416,051, 9,266,969, 9,056,932, 8,882,907, 7,294,194, 5,753,036, 4,654,085, 8,864,905, 8,828,137, 8,764,273, 8,648,120, 8,491,717, 8,268,927, 6,221,152, 5,175,277, 9,505,658, 9,574,076, 9,199,881, 8,430,957, 8,545,620, 8,349,960, 9,040,609, 9,181,130. These patents disclose information about various agents that modify concrete rheology to impart properties of thixopropy, where the at-rest shear strength is sufficient to allow vertical stacking of the concrete, with a shear thinning allowing pumping and manipulation of the zero-slump mix.

The one or more embodiments of the present invention comprises a system to produce a zero-slump pumpable concrete and to define and create vertical or sloped planar surfaces for placement of the concrete by means of a pump, where forms are not utilized, and consolidation of the concrete by vibration can also be accomplished as an option. Most any common concrete or grout pump, as is typically deployed at large or small construction projects, can connect to this system with the most universal concrete hose connection fittings. Concrete that would typically be batched at typical batch plants and delivered by typical concrete trucks can be used with that concrete pump, and one or more embodiments of the present invention modifies the concrete in the pumping line so that it can be placed and hold vertical dimension without the use of forms.

One or more embodiments of the present invention enable fast and easy real-time definition of a concrete vertical surface from pumped concrete as the concrete is being pumped; and it allows vibrating the concrete for consolidation during that placement of the concrete, while maintaining the vertical surface, without the usual forming process.

An embodiment of this geometry-definition system is to place the concrete against rigid foam panels that define the other surface of the concrete, so creating insulated concrete walls without undertaking the typical concrete forming process. Other embodiments of the present invention may include placement of concrete for retaining walls, foundation walls, or elevator shafts, where the concrete is placed directly against the effectively vertical surface of the excavation—or a waterproofing assembly positioned between finished concrete and the earth, etc. Or embodiments of the present invention can be used to construct freestanding plain concrete walls, which may include defining the surfaces of each side of the walls.

Embodiments of the present invention can replace processes such as shotcrete. Any of the backing methods used for shotcrete construction, such as wire lath or drywall panels, can be used with embodiments of the present invention. Embodiments of the present invention can place concrete at full thickness in one pass. Embodiments of the present invention can may also define the finished concrete surface while the concrete is being placed.

One or more aspects of the present invention pertain to providing in-situ structural concrete that does not need forming, yet can be pumped into place with any pump meant for normal concrete or grout. This concrete is suitable for walls of multi-story buildings, or civil engineering projects that would normally require forming, and so on. This type of concrete generally contains normal-weight aggregates, which makes a zero-slump-pumpable mix design more challenging than with light-weight aggregates. In general this type of concrete should not contain such things as excess lime (calcium hydroxide), and should routinely be able to reach in-place strengths of at least around 4000 psi (27.6 MPa) per the ASTM C-90 standard. This mix design must also be able to have the impermeability to survive unfavorable environments with the durability one expects of contemporary structural concrete.

One or more embodiments of the present invention inject and mix into the line of pumped concrete, an admixture that provides the desired zero-slump yet pumpable and workability properties for the resulting concrete, and at a rate that is proportional to flow rate of the concrete. One or more exemplary admixture compositions is disclosed herein. The point of injection is located an effective distance from the discharge end of the line of pumped concrete, to provide mixing benefit, so intermixing the admixture sufficiently with the concrete inline to give it these new properties, but at a length of line that has lower pumping pressure and one that can be removed, replaced and/or cleared of any blockage created from accelerated concrete. Various means of metering the injection of admixture flow rate to proportionally correspond with the concrete flow rate are disclosed. One variation is where the concrete mix water is replaced entirely with a liquid-mixture in the onsite volumetric mixing process, so taking advantage of the short time period between concrete mixing and placement to include agents that allow a rapid set of the modified concrete mixture.

Also disclosed are various methods and apparatus to define and control the geometry of surfaces of the pumped-in-place concrete, and to provide a method of temporary confinement of the concrete allowing further consolidation by vibration. These devices include passive and active means to minimize or prevent a sticky, cement-rich concrete from adhering to their geometry-defining surfaces. These devices are not related to the means and method of making or placing the concrete. Any type of concrete mix with suitable rheology and set rate to satisfactorily hold shape to suit one's need for rate of placement will work. The placement means does have some limitations in that the rate of placement cannot exceed the concrete material properties to hold form, given whatever amount of temporary confinement may be present. For example, if concrete were to be conveyed into place with a large bucket suspended by a tower crane, the discharge rate of concrete from the bucket could not exceed the ability to at least temporarily confine that amount of concrete into the desired geometry. Conveyance by chute, auger, belt, wheelbarrow, shovel etc can all be as acceptable to these geometry definition methods as is placement by pump.

The various elements of any of these devices disclosed herein can advantageously be combined with other devices in many different permutations. Generally, for the present disclosure, only a single example of each feature is given, and any of the other combinations of the features is not also shown, as it is typically apparent that these other combinations of the features can be made by persons of ordinary skill in the art in view of the present specification.

FIG. 1

Reference is now made to FIG. 1 where there is shown a system according to one embodiment of the present invention for performing a process according to one embodiments of the present invention. FIG. 1 shows a concrete mixing truck 1 dispenses concrete into a concrete or grout pump 2, per usual practice. As the concrete is being pumped, a metering pump 3 is dispensing admixture material into an inline mixer 4, and the subsequently modified concrete can be placed in vertical orientation such as a concrete wall 5, without the use of forms. The devices disclosed further below help in the concrete placement by defining the wall surfaces and providing temporary confinement of the concrete for improved consolidation, but the concrete can be placed to build up a vertical dimension without these devices by simply making successive passes of the concrete material. It is to be understood that in view of the present disclosure, the relative positions and orientations of the elements in FIG. 1 can vary significantly from what is shown here, to suit given job requirements and individual preferences.

The concrete mixing truck 1 can be a conventional drum-mixing truck that is normally supplied with conventional concrete materials at a concrete plant with bulk material dispensing equipment, or it can be any other means of batching concrete, such as an onsite volumetric mixing system. According to one or more embodiments of the present invention, this concrete can be entirely conventional in every respect. According to one embodiment of the present invention, the resulting zero-slump-pumpable mix, combined with a minimum amount of subsequently-added admixture (described below) will have a higher proportion of ultra-fine binders. This would most often be a higher proportion of portland cement or fly ash, or both, or similar. These can be substituted with other binder materials, such as natural pozzolans, ground rice hull ash or blast slag, limestone powder, silica fume, et cetera. As the jobsite-added materials are typically more expensive than the batch plant constituents, and because they do not necessarily add strength, it is more economical to start with a type of concrete mix design that can be modified to a zero-slump-pumpable mix with a minimum of the jobsite-added admixture. The slump of this unmodified concrete mix is preferably low, in the range of 2 to 4 inches, but it needs to be pumpable by the given concrete or grout pump 2. This initial low slump is not essential, but it does reduce the amount of admixture subsequently required to bring the concrete to zero-slump-pumpable, and of course the lower water/cement ratios usually makes for stronger concrete. More on the mix design follows the explanation of the drawing figures.

The concrete or grout pump 2 can be any meant for this purpose, and if a cementitious mortar is used, it can be a pump meant for that media. Experiments for one or more embodiments of the present invention were done with a 1970's Mayco C30 HD grout pump, a relatively small and not very powerful concrete pump. The Mayco C30 grout pump (and the essential identical copies of it made by competitors) is likely the most common concrete pump model in the world, assuming one considers grout to be a variation of concrete having smaller aggregate and typically a higher slump. A stronger, more powerful concrete pump will provide more success with less-pumpable and stiffer concrete mixes, so the range of mix designs and amount of admixture disclosed here will work with most any functioning concrete or grout pump, and less jobsite modification to the concrete can be used if a stronger concrete pump 2 is available. The concrete mix used here because of the limits of the smaller ball valve concrete pump used; commonly referred to as grout pump, as the maximum aggregate size capacity is ⅜" (9 mm). The larger aggregate size, such as ¾" (18 mm) of "real" concrete, does not negatively affect the vertical stacking ability of the zero-slump-pumpable concrete, and it does allow for less of the binders and ultra-fines to be utilized while still having the desired zero-slump-pumpable properties. The concrete is pumped in normal concrete pumping hose of the diameter preferred; for a grout pump this would normally be a 2" (50 mm) minimum diameter hose; for this lower slump mix a 2½" (72 mm) diameter hose is preferred. A larger diameter hose allows more latitude in the fluid performance of the mix design. Larger concrete pumps would use 3" (75 mm) and larger hoses.

The metering pump 3 can be part of a system where the pumping rate is adjusted and set manually as shown in FIG. 1, or it can be of a system that will automatically meter the flow rate of the admixture proportionately to the flow rate of the concrete, as is shown in FIGS. 5, 6, 7 and 8 and discussed further below. In any case, the metering pump 3 must have a high enough delivery pressure to reliably inject admixture into the concrete line at the point of injection. According to one or more embodiments of the present invention, the concrete line fluid pressure increases from very high at the pump—roughly some 600 to 800 psi (4000 to 5500 kPa) for common pumping situations with the smaller pumps such as the Mayco C30, and up to 2000+ psi (14000 kPa) for shotcrete pumps—and decreases to zero at the point of discharge at the end of the hose, so that the metering pump 3 must be matched to exceed the concrete pressure at the inline mixer 4, which depends on the distance that is upflow from the discharge. More disclosure on this follows.

There are many options for the metering pump 3. One limiting criterion is the composition of the admixture. If it is low in suspended solids and of a viscosity and composition suitable for a common "airless" pump system designed for applying latex paint, such a pump can economically serve the purpose of metering the admixture proportionally to concrete flow where a relatively low proportion of admixture will suffice. In this case the admixture will need to be filtered as latex paint would need to be filtered. If the admixture contains abrasive or larger suspended solids, or is of a higher viscosity, that will cause problems with an airless paint pump system, then an airless pump system meant for applying texture finishes can be utilized. If the admixture is of a composition that contains substantial solids and/or that will cause problems for an airless texture pump, then a high-solids slurry pump such as a peristaltic pump (hose pump) or a progressive-cavity pump (rotor-stator pump) would be required. The peristaltic pump is typically limited by maximum pressure, where 200 psi (1400 kPa) is typically at the high end, and the progressive cavity pump is typically limited by output volume for reasonably-sized (affordable) pumps. The peristaltic and progressive-cavity pumps have the benefit of commonly being set up with small 3-phase motors with inverter/controllers that allow them to be run at variable pump rate on a single-phase 115-volt power supply. A suitable peristaltic pump is the Vector model 4004, by Wanner Engineering, Inc, of Minneapolis, Minn. As this particular pump is capable of only 110 psi (750 kPa), its use requires the hose tail 6' to be no longer than about 15 feet (4.5 M) depending on the fluid properties on the modified concrete; other Vector pumps will reach 200 psi (1380 kPa), but are a lot more expensive. A suitable progressive-cavity pump is the H-15 "Spray Buddy" (either version) by Hy-Flex Co, Knightstown, Ind. This has variable speed and a built in hopper suitable for a high-solids admixture. Air powered industrial diaphragm pumps, such as those made by Graco, are also entirely suitable for most any required makeup of the admixture and flow rate.

If the admixture composition is suitable for an airless paint pump, then such a high pressure pump, as one typically used by a Painting Contractor, can be modified for this purpose, providing the range of flow rate can be adjusted to match that which is needed. Most airless paint systems have a pressure adjustment that also effectively adjusts flow volume for the line pressure present in this use as a proportional metering system. Essentially all airless paint pumps have high enough pressure to achieve injection into the concrete pump line. For example, a Graco Ultra Max II 595 PC Pro paint pump is sufficient to inject the admixture into a line of concrete, in that it achieves a very high pressure of 3300 psi (227 bar), and produces a flow rate of up to 0.70 gallons per minute (2.6 Lpm). If a 1:40 ratio of admixture to concrete is required, then this would allow the concrete to The metering pump 3 flow rate must of course correspond to the concrete or grout pump 2 flow rate, according to the required admixture ratio, unless other metering methods are utilized as disclosed further on. For example, if pump 3 is capable of 0.70 gallons per minute, and a 1:40 ratio of admixture to concrete is required, then the concrete could be pumped at 28 gpm, which is about 8.3 cubic yards (6.3 cubic meters) per hour. A mix ratio more like 1:80 is preferred, and would allow up to doubling of this concrete pump rate using the same metering pump 3.

A container 31 is used to contain admixture as it is pumped to the concrete line. For a smaller airless pump, this can be as small as a 5 gallon (20 L) pail for lower admixture ratios, and where a higher admixture ratio is warranted, than this container would preferably be larger.

A flow meter 8 is optional to be able to know the instantaneous flow rate of the admixture, where such a device is in not built into the metering pump 3. Many airless paint pumps now have material flow information in a digital readout format, which can be used to determine flow rate. This can be done with a magnetic inductive flow meter, such as the model SM6004 made by IFM Efector, inc. with a USA office at 1100 Atwater Drive Malvern, Pa. 19355.

The material flow is as follows: From the concrete or grout pump 2, the concrete is pumped along a concrete pump hose 6 where it reaches the inline mixer 4. Simultaneously, the admixture is pumped by the metering pump 3 along an admixture hose 9, and through a control valve 10, and then also to the inline mixer 4. The combined concrete/admixture mix is then run through an optional reducer 7 and through the hose tail 6'. The reducer 7 can be a standard part such as is used in concrete pumping. It would typically have an HD flange connection at each end, and it would typically be long enough to avoid blockages per usual concrete pumping practices. The activation of both the concrete and admixture pumping systems can be controlled by a pump switch 11. The switch 11 can be the two different power switches taped together and operated by the same person, or the control wires for the concrete pump 2 and the metering pump 3 can be wired together at switch 11. This can be located adjacent to the location of concrete placement per common practice, and of course it can be wireless. Where an automatically proportional admixture meter system is used (discussed below), it will shut off admixture flow when the concrete flow stops. Other embodiments disclosed omit the need for switch 11. When it is possible that the admixture line pressure would be momentarily lower than the concrete line pressure, a check valve 78 is warranted where the admixture line enters 9 the inline mixer 4. This needs to be a high pressure device, such as a FLCV100T by Fluid Controls Inc, 10050 South 33rd West Avenue, Tulsa, Okla. 74132, distributed by Dultimeier Sales, 13808 Industrial Rd, Omaha, Nebr. 68137. This is a check valve for pressure-wash systems that has a large enough orifice size to function with the admixture liquid containing suspended solids.

One way or another, the metering pump 3 rate needs to correspond proportionally to the concrete pump 2 rate, within the required limits of the ratio of the admixture design utilized. Where the admixture mix design allows flexibility in mix ratio with concrete, the admixture pumping rate can be measured and set to correspond to a normal concrete pump rate. The normal concrete pump rate is adjusted by setting and locking that motor throttle for the speed to run when the control switch is in the "pump" position, per usual practice. Where the admixture proportion needs to be, or is preferably held to, a stricter degree of accuracy, several devices for proportionally metering the admixture are disclosed further below.

The admixture hose 9 must be rated for the pressure created by the metering pump 3 of course, and normal airless paint hose will work perfectly well for an admixture that works with that pump. Otherwise, the high pressure hoses meant for shotcrete admixtures will work. The valve 10 is an optional and primitive means of adjusting the flow rate of the admixture into the inline mixer 4, and where the metering pump 3 allows, it can be used as the means of shutting off admixture flow rather than the switch 11. Of course it can be located at metering pump 3. Alternatively valve 10 can be set to divert admixture flow, when concrete modification is not required, or during clean up.

The concrete/admixture blend leaves inline mixer 4 through a length of a concrete pump hose tail 6', which can be identical to normal concrete pump hose 6, except that the specific length of hose tail 6' is critical because it determines the amount of pumping pressure that will be present at inline mixer 4, and how much further mixing will occur with the concrete/admixture blend after leaving the inline mixer 4. A long enough hose tail 6' can intermix the concrete and admixture sufficiently without the inline mixer 4 present. This length requirement will vary considerably according to the concrete and admixture compositions, and the rate of concrete material stacking that is required.

The specific length of the hose tail 6' is associated with the intermixing effectiveness of the inline mixer 4 and the attainable injection pressure of the admixture. In tests, an effective length has shown to be a minimum of approximately 10 feet (3 M) to sufficiently complete the mixing process, and this is effectively the minimum practical length necessary to provide flexibility to facilitate concrete placement while keeping the inline mixer 4 intermittently stationary, and a 15 foot (4.5 M) length is more practical from this perspective. Longer hose tail lengths are attainable with higher injection pressure, and will ensure complete mixing, but the concrete going though the hose tail 6' is now very stiff and possibly very highly accelerated, so this length of hose is more vulnerable to inline blockages, should there be any delays in concrete placement. Accordingly, keeping it short enough to be cleared out with a length of rebar (typically 20 feet) is very beneficial, and this length has not shown to be not problematic for the injection of admixture with an airless paint pump, for example, but it can be a problem for pumps that reach only around 100 psi (0.7 MPa), depending on fluid properties of the mix. This down line injection system is a real advantage to the inline mixing process for creating zero-slump-pumpable concrete, in that none of the concrete pumping line other than the hose tail 6' contains stiffened and accelerated concrete, so the entire pumping process is easier and less exposed to catastrophic blockage.

The composition of the admixture can vary considerably and the mix ratio with the concrete would correspondingly vary as well, according to the particular specific properties of a given admixture design and the properties of the constituents of the concrete and those mix ratios. The examples disclosed here may not correspond to a given or preferred admixture design that could be by others, and the method here is designed to work with any type of admixture that imparts the thixoptropy necessary to allow the concrete to be stacked vertically, and/or the set acceleration to allow the same thing; or to work with any other new chemical technology that affects a concrete mix to give it the necessary stiffening effect. For example, this can be agents that cause a "false set" of the concrete, which is a premature set that can be relaxed by agitation, typically caused by an excess of gypsum or an agent having the same effect in promoting the development if ettringite crystals. Other examples of thixotropes would be emulsions of Vinyl Acetate Ethylene copolymer (VAE), or of PolyVinyl Alcohol (PVA), or of a highly fibrillated processed attapulgite clay or the like such as is utilized in well-sealing cements; or reinforcing fibers; or an Alkali Swellable Emulsifier, etc. Any of these agents that are activated by the high pH of concrete or the ionic strength of the portland cement solution, can be made to have an extreme thickening effect upon introduction, by injection, to the portland cement environment. This concept of utilizing complementing components, each maintained in separate routes of conveyance until intermixing together, where the reaction can be made to have significant beneficial effect on the concrete rheology. Set accelerators, such as aluminum sulfate, that are utilized with shotcrete can be used in the same manner with this injected admixture system, and many of the sulfate-metal salts also have beneficial effect on concrete rheology.

In addition to the concrete rheology disclosed in the documents incorporated by reference, many concrete rheology modification improvements are being made, and it can be assumed that improved compositions will have potential to improve the effectiveness of the systems disclosed here. An example of this is the rheology modification found by cardon dioxide injection into a concrete mix, developed by CarbonCure Technologies Inc, 60 Trider Crescent, Dartmouth, NS B3B 1R6, Canada. This type of carbon dioxide gas introduction can be used in combination of the following disclosed devices, or can be a constituent of a liquid admixture composition.

For the admixture, constituents beneficial to concrete rheology consist of pulverous and/or liquid defoaming agents, wetting agents, alkyl polysaccharide ethers, hydroxyalkyl polysaccharide ethers and/or alkyl hydroxyalkyl polysaccharide ethers such as cellulose ether, starch ether and/or guar ether, the alkyl group and hydroxyalkyl group typically being a $C_1$- to $C_4$- group, synthetic polysaccharides such as anionic, nonionic or cationic heteropolysaccharides, in particular xanthan gum or wellan gum, cellulose fibres, dispersing agents, cement superplasticisers, setting accelerators, early strength accelerators, setting retarders, air entrainers, polycarboxylates, polycarboxylate ethers, polyacrylamides, completely and/or partially saponified and, where required, modified polyvinyl alcohols, polyvinyl pyrrolidones, polyalkylene oxides and polyalkylene glycols, the alkylene group being typically a $C_2$- and/or a $C_3$- group, which includes also block copolymers, dispersions and foam forming dispersion powders redispersible in water based on copolymers containing emulsion polymers such as e.g. those based on vinyl acetate, ethylene vinyl acetate, ethylene vinyl acetate vinyl versatate, ethylene vinyl acetate (meth)acrylate, ethylene vinyl acetate vinyl chloride, vinyl acetate vinyl versatate, vinyl acetate vinyl versatate (meth)acrylate, vinyl versatate (meth)acrylate, all (meth)acrylate, styrene acrylate and/or styrene butadiene, hydrophobing agents such as silanes, silane esters, siloxanes, silicones, fatty acids and/or fatty acid esters, thickening agents, fillers such as quartzitic and/or carbonaceous sands and/or flours such as quartz sand and/or powdered limestone, carbonates, silicates, layer silicates, precipitated silicic acid, light-weight fillers such as hollow microspheres of glass, polymers such as e.g. polystyrene spheres, aluminosilicates, silicon oxide, aluminium silicon oxide, calcium silicate hydrate, silicon dioxide, aluminium silicate, magnesium silicate, aluminium silicate hydrate, calcium aluminium silicate, calcium silicate hydrate, aluminium iron magnesium silicate, calcium metasilicate and/or volcanic slag as well as pozzolanic materials such as metakaolin and/or latent hydraulic components.

More rheology benefiting constituents consist of polysaccharides and polysaccharide ethers soluble in cold water such as cellulose ethers, starch ethers (amylose and/or amylopectin and/or their derivatives), guar ethers and/or dextrins are polysaccharides and their derivatives are preferably used. It is also possible to use synthetic polysaccharides such as anionic, nonionic or cationic heteropolysaccharides, in particular xanthan gum or wellan gum. The polysaccharides may be chemically modified, but need not be so, e.g. with carboxy methyl groups, carboxyethyl groups, hydroxyethyl groups, hydroxypropyl groups, methyl groups, ethyl groups, propyl groups and/or long-chain alkyl groups. Further natural stabilising systems consist of alginates, peptides and/or proteins such as e.g. gelatine, casein and/or soya protein. Dextrins, starch, starch ethers, casein, soya protein, hydroxyalkyl cellulose and/or alkyl hydroxyalkyl cellulose are particularly preferred.

Synthetic stabilizing systems may also consist of one or several protective colloids. As an examples, there is/are one or several polyvinyl pyrrolidones and/or polyvinyl acetals with molecular weights of 200 to 400,000, completely or partially saponified and/or modified polyvinyl alcohols with a degree of hydrolysis of preferably approximately 70 to 100 mole %, in particular approximately 80 to 98 mole %, and a Hoppler viscosity in 4% aqueous solution of preferably 1 to 50 mPas, in particular of approximately 3 to 40 mPas (measured at 20.degree. C. according to DIN 53015) and melamine formaldehyde sulphonates, naphthalene formaldehyde sulphonates, block copolymers of propylene oxide and ethylene oxide, styrene maleic acid copolymers and/or vinyl ether maleic acid copolymers. Higher molecular oligomers may be nonionic, anionic, cationic and/or amphoteric emulsifiers such as e.g. alkyl sulphonates, alkyl aryl sulphonates, alkyl sulphates, sulphates of hydroxyl alcanols, alkyl sulphonates and alkyl aryl disulphonates, sulphonated fatty acids, sulphates and phosphates of polyethoxylated alcanols and alkyl phenols as well as esters of sulphosuccinic acid, quaternary alkyl ammonium salts, quaternary alkyl phosphonium salts, polyaddition products such as polyalkoxylates, e.g. adducts of 5 to 50 mole ethylene oxide and/or propylene oxide per mole of linear and/or branched $C_6$- to $C_{22}$- alcanols, alkyl phenols, higher fatty acids, higher fatty acid amines, primary and/or secondary higher alkyl amines, the alkyl groups being preferably a linear and/or branched $C_8$- to $C_{22}$- alkyl group in each case. Synthetic stabilising systems, in particular partially saponified, where required, modified, polyvinyl alcohols are particularly preferred, it being possible for one or several polyvinyl alcohols to be used together, where required with small quantities of suitable emulsifiers. Preferred synthetic stabilising systems are, in particular, modified and/or unmodified polyvinyl alcohols with a degree of hydrolysis of 80 to 98 mole % and a Floppier viscosity as 4% aqueous solution of 1 to 50 mPas and/or polyvinyl pyrrolidone. Water-soluble organic polymeric protective colloids with a higher content of carboxylic acid groups are, however, less preferred, in particular if they are produced by means of free radical polymerisation. Thus, the content of monocarboxylic acids and dicarboxylic acids and their anhydrides should be less than 50 mole %, preferably less than 25 mole % and in particular less than 10 mole %. Water-soluble organic polymeric protective colloids consisting of aromatic sulphonic acid condensates are, moreover, also less preferred.

The guidance to define the surfaces of the concrete wall 5 can vary, and for clarity are not shown in FIG. 1. Examples of such guidance are shown on following drawing figures. In any case the concrete can be continually stacked higher at each pass, with the recently-placed concrete below able to provide vertical support through a combination of the fluid thixotropy of the concrete mix, and further below to provide support by the initial set of the concrete placed earlier, as a concrete set accelerator is dosed to suit. With this embodiment of the invention and an optimized admixture design, the concrete can be stacked very rapidly by pumping. Locating the point of admixture injection and intermixing to be at an effective distance from the point of discharge, a maximum effect in thickening and/or set acceleration can be realized, The distance can be short enough to expose only a limited length of pump hose to the resulting higher risk of blockage, and so is a length short enough that can be manually cleared out onsite during the concrete placement; and so a short distance of hose line and short time period to elapse, between concrete modification and placement, allowing use of very fast acting thickeners and accelerators, and agents that will induce a false set of the cement.

For experiments performed using one or more embodiments of the present invention, concrete placement for a wall height of 8 feet (2.5 m) has been obtained within three minutes of elapsed time. This corresponds to a vertical rate of wall concrete placement at 2.67 feet (812 mm) per minute. For example, where a plane of support is provided behind placed concrete, the concrete can be pumped into placed at full thickness of a wall that is in the range of 4 inches (100 mm) thick or more, and hold this vertical orientation and shape, as fast as it can be pumped by the concrete or grout pump used for this testing, for walls as narrow as 2 ft (0.6 m) wide.

FIGS. 2A through 2E

The inline mixer 4 is a device that provides a means to inject the admixture into the concrete as it is being pumped, and to intermix that admixture with the concrete in line. The inline mixer 4 provides inline mixing for two liquids within a pressure line, where one liquid is injected into the other. Mixer 4 has the same benefit for any of the proportional metering devices disclosed, and has various useful embodiments. As such, adjacent to an inline mixer casing 12, is an admixture injection assembly 17, which injects admixture into the pressure line of concrete upstream of the inline mixing process.

Figure 2A:
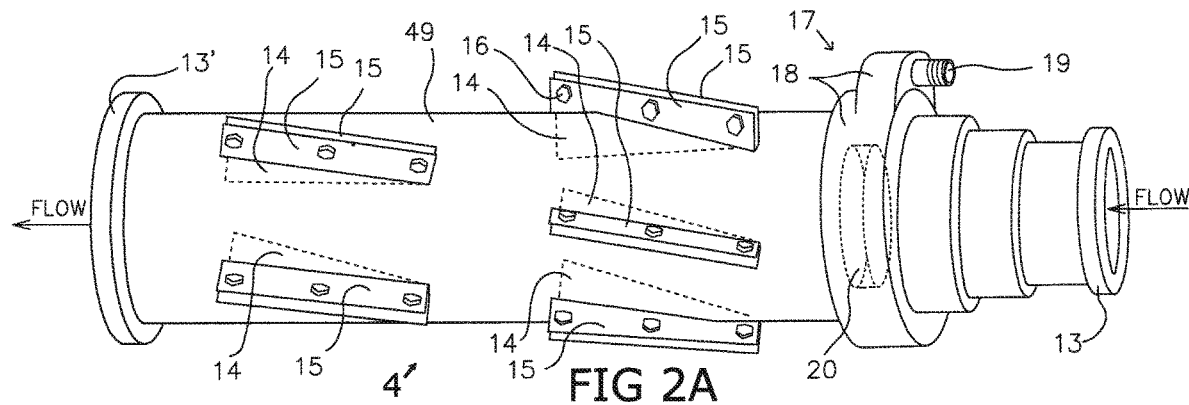
Figure 2B:
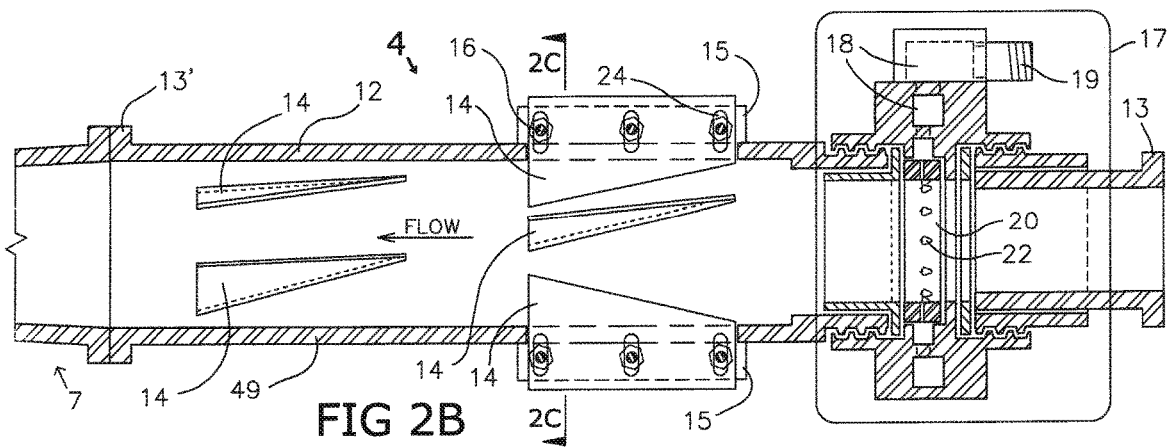

As one can see on FIGS. 2A, 2B, and 2C, the inline mixer 4 has the casing 12 that is a cylinder of a larger diameter than the concrete pump hose 6. The prototype is 3" (76 mm) schedule 80 aluminum pipe, as other existing components for fabricating the prototype device are of aluminum. It is designed for ⅜" (9 mm) aggregate; for ¾" (18 mm) aggregate, 4" pipe would be appropriate for this inline mixer 4 design. Schedule 40 steel pipe is appropriate material for casing 12. The larger diameter for casing 12 relative to hose 6 is helpful in allowing a number of a mixing vane 14 to be projected into the line of pumped concrete without creating blockage to the concrete flow. This is the reason for showing the reducer 7, so that hose tail 6' can be the same diameter as hose 6, or smaller, but this is optional. The outflow end of casing 12 has a HD flange outlet 13' to connect to reducer 7 or hose tail 6' of matching diameter. The HD connection flange is universal for concrete pressure lines.

This design shows two sets of mixing vanes, which allows sequentially increased mixing. One can see a that each of the mixing vane 14 is skewed to force flowing concrete off the projecting edge, so creating a vortex toward the center of the concrete flow as is possible without creating blockages, and to maximize mixing as possible. Each mixing vane 14 is effectively clamped into place between a pair of a vane connection flange 15, and the clamping force created by at least 2 of a bolt assembly 16, or the equal, which can be any machine screw with hex nut preferably of ¼ inch (6 mm) diameter, that passes through a slot 24 in the mixing vane 14 and though a hole in each vane connection flange 15. The slot 24 can be an oblong hole or a notch, with a length sufficient to provide required beneficial adjustment. This type of attachment makes the positioning of each mixing vane 14 adjustable with respect to the amount of its projection into the inline mixer 4. This adjustment is necessary to accommodate different concrete mixes and aggregate sizes without creating blockages, yet maximizing the amount of mixing. The size of and resulting intrusion of each vane 14 can vary as shown in FIG. 2C, with some reaching closer to the center of flow to affect that portion of concrete, but not all so as to avoid potential flow blockages.

In this embodiment each mixing vane 14 is skewed at 15 degrees from the inline mixer 4 longitudinal axis, and is of ⅛" (3 mm), or thicker, stainless steel or plain carbon steel, and at the furthest projections, and given varied sizes, adjusts from 0.75" to 1.5" (18 to 37 mm) dimension into the casing 12. Each of the vane connection flange 15 is of ⅛" (3 mm) minimum thickness and is welded to the casing 12. This arrangement is to make the vanes 14 easy to adjust as they wear, and inexpensive to replace when worn out. The length of each of the vane 14 must match each corresponding slot opening in casing 12, with minimal clearance, to avoid concrete and liquid leakage under pressure. Of course there are many options to affixing these vanes. Minimal leakage where they penetrate casing 12 is not a problem.

Each of the pairs of the vane connection flange 15 is preferably sloped at least approximately 10 degrees from perpendicular to the average tangent of the surface of the casing 12—on average over the mixing vane 14 length—thereby sloping each of the mixing vane 14 in the direction that the concrete flow pushes on it. This slope prevents aggregate in the concrete from getting stuck in the crevasse at the upflow side of any of the mixing vane 14. Of course this slope can vary considerably with successful results.

Back to FIG. 2A and FIG. 2B, an admixture inlet 19 is connected to the hose 9 (of FIG. 1). Admixture flows though an admixture plenum 18, which distributes it around an admixture injection ring 20, which before modifications, was a "water ring" for spraying water into a dry shotcrete mix that is being conveyed by a stream of pressurized air. The assembly 17 shown here is of a 2" (51 mm) dry process "swivel nozzle body" marketed by Putzmeister America Inc, of Sturtevant, Wis.; originally manufactured by Allentown Equipment of Allentown, Pa. The swivel nozzle body has a threaded connection at each end; one for the "swivel hose coupling" at the inflow side, and one for the shotcrete nozzle at the outflow side. In this case, the shotcrete nozzle is replaced with the length of casing 12 that is welded to the same threaded end that is on an aluminum shotcrete nozzle. Both of these parts screw into the swivel nozzle body against a rubber gasket, shown in FIG. 2B.

The admixture injection ring 20 has a number of an injection orifice 21, that surround the line of concrete flow. Each can have a corresponding injection shield 22, but these are optional. Each of the shield 22 is located partially over each of the orifice 21 in a manner creating a shield cove 23 corresponding to each orifice 21. The purpose of the shields 22 is to effectively create a small vortex and region of low pressure at each orifice 21, and in provide a path for the admixture to enter the concrete and penetrate it further, facilitating a more complete mixing of the two fluids. The same type of benefit can be provided to a lesser degree by sloping each orifice 21 in the direction of concrete flow, in lieu if including shields 22. This low pressure effect created by the shields 22 also has the benefit of allowing the use of a weaker metering pump 3, and helps with to draw admixture into the concrete as it flows, and not draw admixture in when the concrete flow is stopped, so assisting in the proportional metering process. There is no magic to the total number of orifices required; more is better except that the totality of the shields 22 creates the potential for blockage of concrete flow. A commercially available "water ring" commonly has 12 orifices. This should be considered a practical minimum for efficient intermixing; more orifices being better for intermixing. Testing showed that typical water ring orifices 21 are of a diameter too small for reliably passing admixture with suspended solids—such a water ring will immediately clog up with the preferred admixture composition for zero-slump-pumpable concrete.

The admixture injection ring 20 requires each of the orifice 21 to be of a diameter suited to the material making up the admixture. Suspended solids can create blockages; their makeup and concentration, along with the viscosity and lubricity of the admixture, determines the required size of each orifice 21. Assuming a viscosity of around 500 cP—which is around 66% of the way to latex paint from water—and a mix with suspended solids of soft, milled clays, each orifice 21 should be in the range of 3/32" (2 mm) diameter. For higher viscosities and suspended solids in higher concentrations or of harder materials such as silica particles, the orifice 21 diameter would need to be increased to around ⅛" (3 mm). Experimentation may be the only way to make this determination for a given admixture formulation, more on that follows in the admixture disclosure below. Making the orifices too large has the effect of increasing admixture seepage into the concrete line while all pumping is paused, and causes over consumption of admixture. In any case, while pressurized concrete is within mixer 4, admixture should be present under equal or greater pressure at the orifices 21, to avoid having the concrete material push into the orifices 21 and clog them up.

The shield 22 experiences aggressive conditions. It needs to be as abrasion resistant as possible, so is appropriately of manganese steel, or the equivalent, that is either hard-faced or hard-chrome plated; or each of the shield 22 can be entirely of weld-on hard-facing material. The exact size and shape will vary as it wears down, and fortunately it serves the required purpose at varied geometries and size. The inline mixer 4 functions without the shields, but the mixing is then less complete, at least within the inline mixer 4; and the demands on the metering pump 3 are greater. The preferred geometry for each shield 22 is a split, truncated cone that is located primarily up-flow of each orifice 21, where the split face is at the down flow side, aligned perpendicular to concrete flow and with orifice center. So the orifice 21 is effectively also partially bored into the shield 22, so creating a shield cove 23 at each shield 22. Each of the shield cove matches the corresponding orifice 21 and projects at least that diameter in distance outward from the inner surface of ring 20. The projection of the shield 22 is ideally around 5/32" to 3/16" (4 to 5 mm) from the surface of ring 20, and the truncated top is ideally around 1/8" (3 mm) diameter, with each cone side surface sloped at around 25 degrees from vertical; and the leading edge slope is at approximately 45 degrees. This creates a base width of around 1/4" to 5/16" (6 to 8 mm) transverse to the flow, with the split face taking around 3/16" (4 mm) off of the down flow side of this base. In the direction of flow, the shield base dimension is approximately 3/8" (9 mm). This dimension can be increased significantly to increase wear resistance. All of these measurements can vary considerably and the shield 22 can still provide the stated benefits to assist in mixing the admixture into the concrete, and of course the stated shape can and will have a smoothed and rounded form after use, as depicted in FIG. 2E.

FIG. 3

This shows one example means of defining cast-in-situ concrete wall geometry, such as would be done for an insulated building. As the zero-slump-pumpable concrete mix makes building custom walls of concrete easier, it is anticipated that home construction will begin to adopt various versions of this concrete wall construction method. This wall has the solid concrete all on the interior side to provide thermal mass where it benefits comfort and energy efficiency, and has all of the insulating foam on the outside where it belongs, with some type of a stucco type finish over that. This arrangement is chosen for this example as it is optimal for energy-efficient construction, but it can vary of course, as for some climates insulating foam is not required, or it can be replaced with a layer of zero-slump-pumpable insulating concrete placed by this same method.

Assuming a conventional concrete foundation with cast-in-place vertically-projecting reinforcement is already built (not shown in this drawing figure), a number of a rigid foam panel 26 is erected in place, and each of a perimeter screed guide 27, is affixed. These are anticipated to be removed later. Temporary bracing to hold the wall plane vertical is not shown. After windows and doors et cetera are located, each of an interior screed guide 28 is affixed. These guides can be permanent or temporary. Both the perimeter screed guides 27 and the interior screed guides 28 are positioned in order serve to define a concrete vertical surface 25.

Numbers of a reinforcing bar 38 are tied in place per usual practice, and with excellent access as no forms or building blocks are in the way. Any of an electrical box recess 30 is located as required, simply using the electrical box itself as a blockout means. It can be attached to the face of the rigid foam panel 26, and spaced from it as required. Any such similar plumbing and mechanical blockout can be easily accomplished by the same means, along with any necessary associated carving out of the rigid foam panel 26. The zero-slump-pumpable concrete is then pumped into place via the concrete pump hose 6', in subsequent passes beginning at the bottom of a section of wall and working upwards in subsequent passes of concrete being placed 36. As sufficient concrete material is pumped into a given section of the wall, the concrete vertical surface 25 is screeded off with a screed board 29, in the same manner as conventional concrete slab surfaces are defined. The exterior side of the rigid foam panel 26 is clad with a cementitious coating 39 such as stucco or a proprietary fiberglass-reinforced acrylic finish. Stucco is preferable for fire resistance, and it would typically have wire ties through the foam to attach it to the cast concrete wall.

Of course this is just one example of the many ways to exploit the benefits of zero-slump-pumpable concrete for home construction. It is so much nicer, cleaner, pleasant, economical, less wasteful, and quieter than is using the shotcrete process for building concrete walls. Unlike swimming pools and skateboard parks, building construction projects are not at all conducive to the extensive concrete rebound material mess left in front of vertical surfaces being sprayed with shotcrete.

FIG. 4

This is an example of how to define a concrete foundation wall without the need for pre-situated vertical panels or surfaces. In this case, the concrete wall will be built it right up to a stay-in-place mudsill of appropriate material, something that cannot be accomplished if forms are in the way of the concrete placement, but this geometry is optional. This method can be particularly useful for retrofit foundations under existing buildings. The soil surrounding this portion of foundation is stripped away and not shown for clarity; the footing concrete is indicated to be normal concrete placed in a dug trench or with forms per usual practice, but of course it can always be zero-slump-pumpable concrete.

A continuous concrete footing 32 is placed in-situ, either at an earlier concrete placement, or at the same placement as the foundation wall. If both are at the same placement, conventional low-slump concrete can be used for the continuous concrete footing 32, if desired, and then the admixture can be introduced to produce the zero-slump-pumpable concrete for the wall, during the same concrete placement as the continuous concrete footing 32. If both are of the same concrete placement, it is beneficial to make that switch before the concrete for the curb atop the footing is placed so that it will have zero-slump. Of course the curb can always be defined with a single conventional form board, each side, as part of a separate conventional concrete placement. Either way, each of the reinforcing bar 38 is typically first tied in place per usual practice, if such reinforcing is required.

A mudsill guide 33 can be a permanent or temporary member. It is staked into place, if any such affixing is required, with a number of a bracing stake 34. A number of an anchor bolt 37 is pre-attached as required for building anchorage, where the mudsill guide 33 is to be left into place for subsequent wood-framed construction. A vertical screed board 35 is fashioned for each side of the wall, sized to allow a clear path of travel as possible. Handles are helpful but are optional. The concrete pump hose 6' is directed to the wall plane, to create the concrete being placed 36, and each concrete vertical surface 25 is defined with the guided movement of each vertical screed board 35.

As the zero-slump-pumpable concrete with normal-weight aggregates is so easily pliable while holding a vertical shape, this type of minimalistic technique for defining the finished concrete geometry is sufficient. Of course these types of methods really facilitate the construction of more complex shapes using concrete, because the finished concrete geometry can be defined without building the heavy formwork. For example, a cylindrical shape can be defined by a vertical screed that is physically attached to a fixed pivot point; or where precision is not important, the top edges of a garden wall can even be defined by setting the zero-slump-pumpable concrete to a pair of strings set onto batter boards.

The geometry definition means disclosed herein are not at all required for placement of this modified concrete into a geometry having significant vertical dimension; the modified concrete can be stacked over itself to build up the vertical dimension, while that concrete can be pumped into place. Placement by other means can be also done. The various guidance means disclosed herein provide various ways to define where the finished concrete surfaces will be, and they allow that to be done in a rapid manner so as to keep up with a preferred rate of concrete placement, and they can provide a temporary confinement of the concrete allowing consolidation by conventional vibrational means.
FIG. 5

This shows the simplest means of directly proportioning the admixture and concrete flow rates. A positive displacement pump 40 is linked directly to a flywheel 41 of a mechanical concrete or grout pump. This is in contrast to a hydraulically-powered concrete pump which typically has no flywheel. The flywheel 41 is supported by a drive axle 43, typically in pillow block type bearings, not shown, and connects to a power source with a drive belt 47. The rotational axis of the pump 40 is coupled with a hub connector 42 to the flywheel 41 with a sufficient number of machine screws tapped into the flywheel 41 hub, or equivalent. The hub connector 42 is a ⅜" (9 mm) minimum thickness piece of steel plate fitted to accept, or welded to, a shaft coupling that mates with the pump 40 shaft and keyway. A shaft coupling or the equal is necessary to provide the directional flexibility to allow for misalignment of both shaft axes, per usual machine practice. A shaft coupling, such as the "L Series" manufactured by Lovejoy Inc, 2655 Wisconsin Ave, Downers Grove, Ill., 60515, USA, is a suitable shaft connection here, to avoid problems of axis misalignment. The pump 40 is supported and aligned in place by a number of a support member 45, each of which is typically fastened to a chassis member 44 of the concrete pump trailer structure. This connection will vary with each concrete pump model, as the trailer structures vary. The arrangement for each of the support member 45 is determined by the fastening elements and requirements of the pump 40 selected. This is all known art. A configuration that allows the concrete pump hood, unmodified, to close, is the best way, and some of the pump 40 arrangements disclosed here to allow that with the Mayco C 30 HD. The hood can always be modified as required.

Pump 40 must be of an essentially positive displacement type, in that the flow must be reasonably proportional to shaft rotation, within limits, given anticipated line pressure and admixture viscosity. Accordingly, acceptable pump types include dual gear pumps such as the oval gear, dual impeller, lobe displacement, et cetera; and include the progressive cavity and peristaltic pump types, as well as the rotary vane or rotary piston pump, and so on. The selection of pump 40 size is determined by the proportional quantity of admixture it pumps per rotation in relation to the amount of concrete that the concrete pump displaces per rotation of the flywheel. This relationship must match the preferred proportion of admixture to concrete, or the admixture can be formulated to match the proportional pump rates.

The Mayco C30 HD concrete/grout pump displaces roughly around 0.03 gallons (0.1 L) of concrete per flywheel 41 rotation. The corresponding pump 40 should effectively displace an appropriate volume of liquid per rotation, under the line pressure conditions present. The actual effective output will vary from the published values, depending on the pump type, because the very low rpm in this application—typically less than 500 rpm—which is below the design parameters for most pumps. The only sure answer is to install a particular pump with a given admixture design and prove performance. Very good results with the direct drive setup have been obtained with a positive displacement dual gear pump, such as the Dayton 4KHG4, providing the admixture has sufficient viscosity but does not have solid particles that are not compatible with such a gear pump. The model 4KHG4 displaces around 0.0009 gallons (0.0034 L) per rotation into a line pressure of 60 psi. This translates roughly into a 1:30 admixture:concrete ratio, which is well within the acceptable range of admixture ratio. For lower proportions of admixture a drive speed reducer of appropriate reduction ratio is suitable, such as one of the "Raider" worm-gear reduction series by Morse, Inc. If the admixture composition has solid particles and so is incompatible with a gear pump, then a peristaltic pump can be used in this direct drive configuration. However the peristaltic pumps are commonly designed for a much lower rpm than is typical for flywheel 41, so the direct drive installation would need a such a gear reduction system as is common for such pumps. The drive speed to suit any pump can be changed with use of a belt drive system.
FIG. 6

Reference is now made to FIG. 6 where there is shown a belt drive option according to one or more embodiments of the present invention for a proportional admixture pump that allows a much greater range of pumps to be utilized, in that this allows the proportional rotational speed of the admixture pump to vary from the concrete pump. For this case, a peristaltic pump is shown as an example in FIG. 6 whereby the admixture can include solid particles etc. This type of pump is typically designed to run at speeds below around 120 rpm, and so the belt drive system shown here is to reduce speed. Assuming the flywheel 41 rotates at around 500 rpm, then a drive ratio should be in place that provides at least a 4.2:1 speed reduction to get down to 120 rpm, or as needed to deliver the required proportion of admixture. For many other types of pumps, the belt drive system would be set up to increase the admixture mump speed, as most pumps in general are designed for rotational speeds faster than 500 rpm.

Attached to the flywheel 41 is a drive pulley 46. A drive belt 47' connects that pulley to a driven pulley 48, which is attached to the shaft of pump 40'. Pump 40' is affixed to chassis member 44 in a manner that provides for appropriate alignment, adjustment and tightening of drive belt 47' as would be normal for driving a pump such as this, all well known arts. This actual speed will vary with concrete pump speed, but the more important proportional speed does not vary unless pulley changes are made.

Existing technology can be used for making any required adjustment to the proportional speeds of belt driven pumps. This can be as simple as mounting different diameter pulleys. Fine adjustment can be made by utilizing an adjustable-diameter version of driven pulley 48 on the shaft of pump 40'. This can be one manufactured by Lovejoy Inc, 2655 Wisconsin Ave, Downers Grove, Ill., 60515, USA. Their model 27828 will adjust in diameter from 1.72 to 4.65 inches (44 to 118 mm), providing a 270% adjustment in proportional speed ratio. Of course any pulley change also requires tension adjustment of belt 47'. To avoid the readjustment of pump 40' mounting, a spring loaded belt tensioning system with an idler pulley, such as is found on "ride on" lawn mowers, is an appropriate arrangement. Proportional adjustment during pumping operation can be implemented with technology such as British patent GB2526675 "Continuously Variable Transmission" of 04/2015 by Pattakos, and other available variable-drive-rate technologies for belt-drive systems that are adjustable while running, with applications ranging from drill presses to automobile transmissions.

FIG. 7A

This is a simplified diagram of an electronic control system for proportional metering of admixture that is based on the flow rate of a hydraulic fluid system powering a concrete pump. A hydraulic line 53 that is the source of pressure for driving the concrete delivery pistons, and is beyond any return line loop or relief valve system, will have a flow of hydraulic fluid that corresponds proportionally to the flow rate of concrete within a particular piston drive system. That is, for the typical dual piston concrete delivery system, line 53 is tapped with a flow meter transmitter 54, at a location between an actuator that pushes a cylinder of concrete and is beyond any return line or relief valve. For both a single acting and double acting fluid system, the flow of pressure-side hydraulic fluid during the forward stroke driving the piston will be proportional to the outward flow of concrete in that corresponding cylinder. At this same location for the line, in the retraction stroke, the flow of hydraulic fluid in the opposite direction will be proportional to the outward flow of concrete in the other cylinder. Thus for this purpose, the flow meter and transmitter 54 must be reversible and send an identical signal for either direction, or the signal must pass through a rectifier circuit to send a single polarity variable signal for opposing directions of hydraulic fluid flow.

A flow meter and transmitter 54 that serves this purpose is one such as that made by UK Flowtechnik Ltd, 1 Central Park, Lenton Lane, Nottingham, NG7 2NR, UK. The model series "Hysense QT 100" are turbine meters built for high pressure hydraulic fluid lines such as this, and have electronic circuit attachments that are built for this type of a control system. There are many other such meters of various technologies, and when included with proper electronic components and a DC power source and ground, that will send a flow control signal 55 that corresponds to the positive or negative flow rate in hydraulic fluid line 53, and is proportional to the total concrete flow rate.

A variable power inverter 56 is utilized as a speed controller. This can be one such as the TECO FM50, by TECO-Westinghouse Motor Company, 5100 North IH-35, Round Rock, Tex., 78681. This inverter requires an AC power supply 57 of 115V at 60 Hz, and provides a modified 3-phase 230V power source 60 at a frequency determined by low-voltage inputs. This inverter requires an enclosure to provide protection from the moisture and contamination found at jobsites, with ventilation to prevent overheating. The flow control signal 55, and a potentiometer 58 that creates a control signal 59, are each connected to the proper low-voltage terminal of the variable power inverter 56, whereby their signals then modify the frequency of the 3-phase power source 60, and control an admixture pump system 61. The potentiometer 58 is typically part of a remote control box that includes other motor control signals for the inverter 56, such as "stop" and "reverse". In this embodiment an admixture pump system 48 is powered by a 3-phase 230/460V motor designed for variable frequency power, such as the "Black Max" model HH 56H1 7E5303B P, by Marathon Electric Motors, 100 E. Randolph Street, Wausau, Wis. 54401-8003, USA. Where this motor is connected to a high torque pump such as a peristaltic pump, it is supplied with a direct-drive speed reducer, such as a type RF37AM56 by SEW-Eurodrive, Inc, P.O. Box 518, Lyman, S.C., 29365, USA.

FIG. 7B

This shows an ultrasonic flow meter and transmitter 62 that is linked to the concrete pump hose 6, or any line of a concrete delivery system, and sends a flow control signal 55' which corresponds to the concrete flow rate. The region of measured flow would need to be a length of straight rigid pipe with smooth transitions, per the flow meter manufacturer's requirements. A type of ultrasonic meter that measures concrete flow rate accurately enough for this purpose is the "DXF" meter series with the model DT-94 clamp-on transducers, now manufactured by Badger Meter, PO Box 245036, Milwaukee, Wis., 53224, USA. This flow meter system operates by measuring the Doppler Effect on solids within the moving fluid.

In combination with the other disclosures, a working example is given for a set of components that serves the purpose of measuring hydraulic fluid flow rate, or concrete flow rate, in order to meter admixture injection proportionally to the concrete flow rate by an electronic means to produce a zero-slump pumpable concrete mix. There are many other variations of these components that will serve the same function.

FIG. 8

Of course the admixture pump can be hydraulically-driven from the same pressure system running the concrete pump, using the flow meter and transmitter 54, or flow meter and transmitter 62, to provide flow control signal 55. This simplified hydraulic schematic shows only the signal 55 controlling a proportional hydraulic valve 67, which could alternatively be a servo valve or the like; where valve 67 controls the hydraulic fluid flow rate to a hydraulically-driven admixture pump system 61'.

Valve 67 could be one such as a SP08-20 by Hydraforce Inc, 500 Barclay Blvd., Lincolnshire, Ill. 60069. This specification depends on the onboard voltage and the concrete pump size. Valve 67 may require amplification of signal 55 to operate within range of required flow, or a larger valve may be required. The hydraulic motor powering the admixture pump, making up the admixture pump system 61', can be one such as the NorTrac Bi-Rotational Pump/Motor Model #CBS6-F2.1SS, marketed by Northern Tool Inc, 2800 Southcross Drive West, Burnsville, Minn. 55306.

This schematic does not show any necessary check valves, pressure compensation system, feedback loop, manual control overrides, etc, that would be determined by the concrete pump manufacturer in the design of the comprehensive hydraulic system. The component sizing for optimized operation and stall prevention would be related to the specific properties of the onboard hydraulic system and the concrete pump rate.

FIG. 9

Figure 9A:
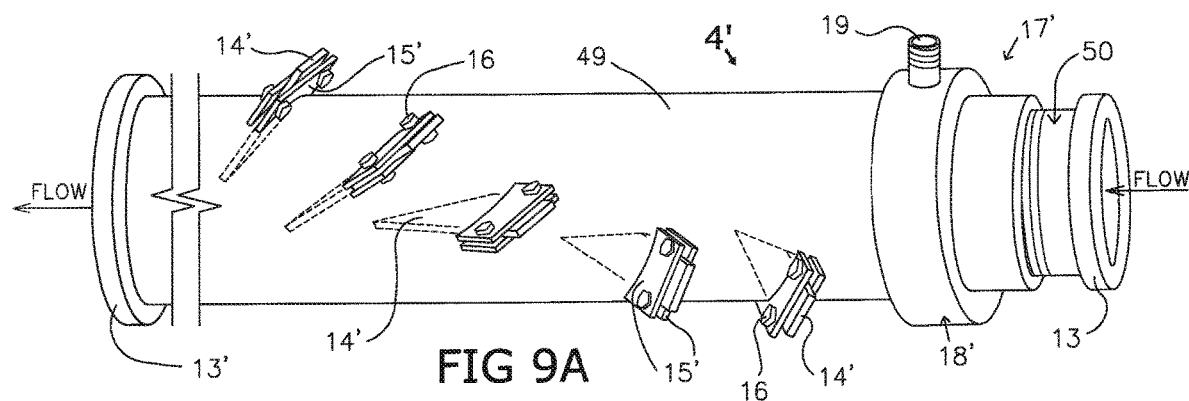
FIGS. 9A through 9C show various views of a modified inline fluid injection and mixing device.
Figure 9B:
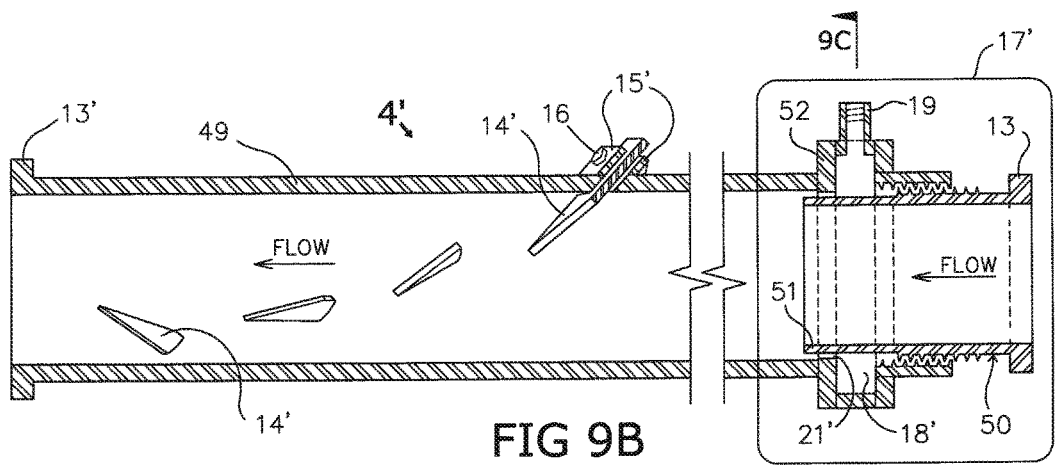
Figure 9C:
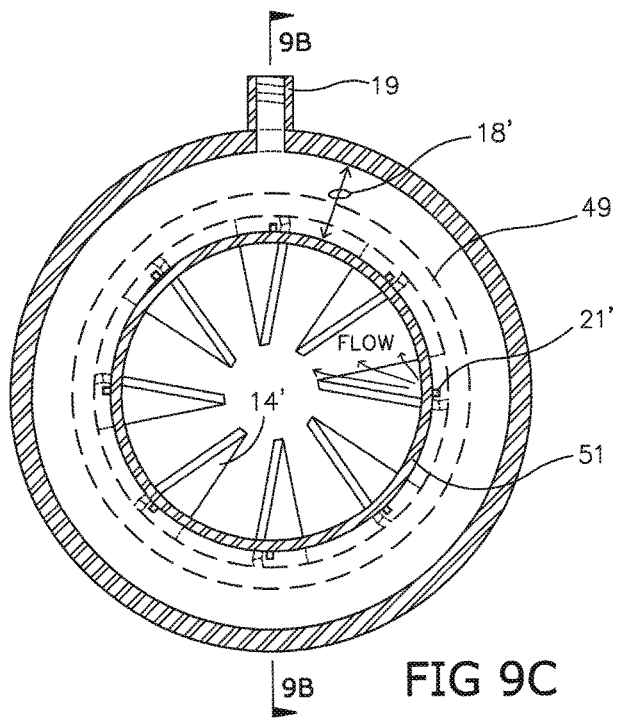
Figure 10:
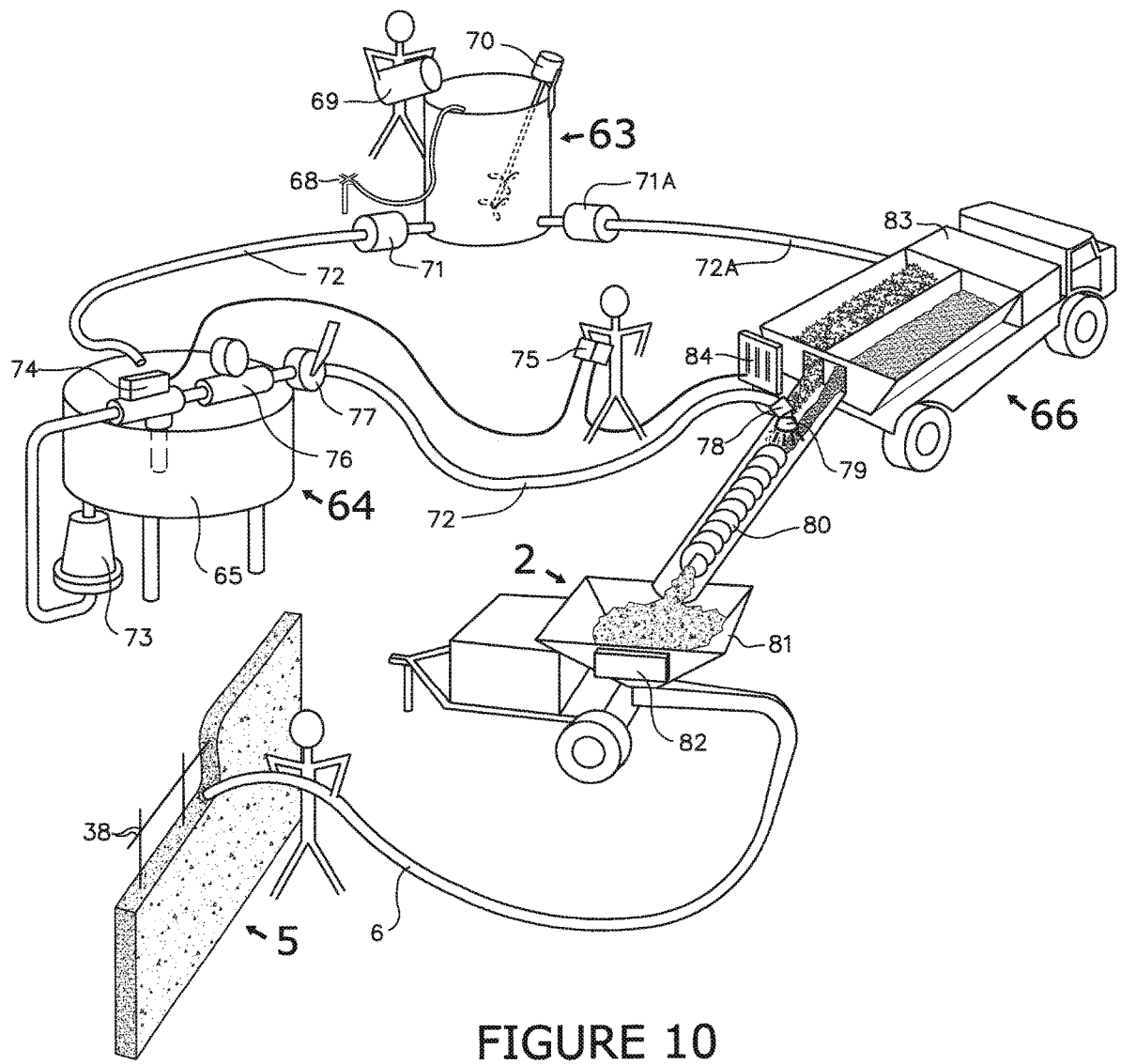
FIG. 10 shows a method and system using a volumetric concrete mixer to make zero-slump-pumpable concrete for the blending, mixing and placement process of the zero-slump-pumpable concrete.

FIG. 9A is a side view of a modified inline mixer 4'. FIG. 9B is a longitudinal section. FIG. 9C is a transverse section cut at a modified admixture plenum 18'. Much of this description also notes relative differences to inline mixer 4, referring back to FIG. 2A and FIG. 2B.

Mixer 4' differs from mixer 4 in that it has modified mixing vanes 14', preferably of stainless steel, or hardened or wear-resistant materials per FIG. 2E. Each vane 14' is of a shape and orientation designed to disrupt the flow of admixture away from the periphery of the concrete pump line, as much as practical. The planar surface of vane 14' is more perpendicular to the concrete flow direction than is vane 14, so that each induces a vortex pattern into the concrete flow, much as would a stalled wing. There is sufficient transverse angle (twist) to direct material flow to some degree in a spiral manner, with sufficient slope to also generally direct flow toward the center of the pressure line. Compared to vane 14, vane 14' projects much further into the concrete flow, and the slope angle is greater than the twist angle, or both of these angles are similar. These combined features allow vane 14' to direct admixture generally more toward the center of the flow. As all of the admixture starts at the flow periphery at initial injection, a maximum mixing benefit can be gained from maximum disruption of this initial flow pattern. This prototype has a twist of approximately 40 degrees, and a slope of approximately 35 degrees, each angle measured from the direction of flow, so this vane orientation has about 5 degrees more slope than twist. These angles can vary considerably while still producing very effective mixing action. A goal is a flow pattern such as that indicated on one vane in FIG. 9C.

The increased projection of each vane 14' is possible, without causing blockage to concrete flow, by shaping each vane 14' to be narrower than vane 14, and by staggering the location of each vane along the direction of flow. These features allow each vane in turn to create maximum disruption without creating blockage, and so this type of design provides efficient intermixing of admixture. This staggered layout allows larger aggregate to flow though mixer 4' having the same diameter body 49 as mixer 4, even though each of the vanes 14' project most of the way to the center of the body 49. This stagger allows the body 49, of 3 inch (75 mm ID) pipe, to pass ¾" (18 mm) aggregate, providing the stagger distance is sufficient to avoid the combination of any two vanes to create a blockage. This prototype provides about 2" (50 mm) of stagger between any 2 vanes, and with a total of 8 vanes, each is rotated 45 degrees from the previous one—with that polar axis being the center of the body 49. A more random pattern, or a staggered double helix pattern, not depicted, would create less tendency to block flow between any two vanes, and the entire unit could be of a shorter length than this prototype and have a similar mixing effect.

The width of vane 14' can vary from about ¾" (18 mm) to 1.5" (150 mm) or more, with the portion projected entirely into the concrete flow tapered in width, all or partially. This taper length and angle is unimportant, and no taper simply poses an increase in the possibility of a blockage. As one can see in FIG. 9C, there are gaps between the vanes in the projected view down the pipe; this is to minimize a possibility of blockage. As each vane is aligned with each of a modified injection orifice 21', the effectiveness of each vane is maximized while areas having gaps makes less difference.

The more slender aspect ratio of vane 14' forces material to go around it, providing more mixing action. The required thickness of vane 14' is in the range of ¼" (6 mm) or so as the planar surface is more exposed to loads and wear from concrete flow. Each vane has its projection distance easily adjusted into the flow, in that it is clamped between two of a modified vane connection flange 15'. Each bolt assembly 16 passes though each flange 15', each side of vane but not though each vane 14'. Slots are not necessary in vane 14' to change the projection length into the flow; it is affixed only by pinching action between flanges 15'. For this reason and because vane 14' loads are higher, the thickness of each flange 15' must be at least ¼" (6 mm) if of aluminum. The length and fit of each slot in body 49 must closely match the corresponding width of vane 14' to prevent too much fluid leakage under pressure. That clearance would be the minimum required to allow vane to be moved further into body, which can be done with a hammer A minor amount of leakage is acceptable. Vanes are made longer than needed to have material for adjustment into body as they wear.

Inline mixer 4' prototype is primarily fabricated from materials, primarily aluminum or steel material, rather than starting from existing hardware or equipment. The admixture plenum 18' is created from pipe and plate material. Each orifice 21' is made by creating a notch in a seal plate 52, the notch being about 1.5 mm to 2 mm wide by 1.5 mm to 2 mm deep, but this can vary considerably. They may have to be larger to avoid blockage if the admixture contains large solids; though larger sizes will weep more when not desired, wasting some admixture. Plenum 18' is sealed by the fit of a cylindrical flange 51 and the fit of a cylindrical insert 50 into the receiving end of mixer 4', with matching pipe threads or an acme thread with a gasket, etc, made for the several-hundred psi plenum 18' pressure. The outside diameter of insert 50 closely matches the inside diameter of seal plate 52 to minimize the seepage of admixture through this gap, which is the range of a few thousandths clearance (0.1 mm), but the precise clearance distance is generally not critical. The seepage through this gap is acceptable and is part of the intended flow of admixture injection into the concrete, as it literally spreads the distribution of admixture around more. The purpose of the array of each orifice 21' is to direct most of the admixture toward each corresponding vane 14'. The Cylindrical insert 50 is of stainless steel or hardened or wear-resistant materials per FIG. 2E, and includes the HD flange 13, that is of the steel material normally used for these connectors. Flange 51 extends beyond plate 52, protecting it and the orifices 21' from wear. The portion of flange 51 extending beyond plate 52 preferably has some taper around the outside, facilitating fit of insert 50 into body 49. The discontinuity created by the sudden change in diameter from cylinder 50 to body 49, helps in the dispersion of admixture into concrete, and lowers the localized pressure, aiding in the injection of admixture into the pressurized line of concrete. This cylindrical insert 50 geometry aids in improved admixture injection without exposing elements, such as the injection shields 22 of mixer 4, to exposure and wear from the pumped concrete. As cylinder insert 50 can remove and expose plenum 18', this aids in cleaning out the plenum after use. As the orifices 21' are built into the mixer 4' they can be assured to align preferably with vanes, assuring more control over the mixing action.

HD flange 13' is welded to body 49, if body is steel pipe. Flange 13' has attached pipe threads or the like to fit threads or a threaded fitting of body 49, if it is aluminum. A logical arrangement of the geometry of mixer 4' results in the discharge flange 13' being a larger size than inlet flange 13, such as 3" (75 mm) verses 2.5" (63 mm), and hose tail 6' for maneuverability is generally preferred to be of a smaller diameter than hose 6. Therefore a reducer is typical at the connection to 13'; this may be from 3" (75 mm) to 2" (50 mm), for example.

FIG. 10

A central idea of this embodiment is to replace the all of the water constituent of concrete made by the volumetric mixing process with a water-based liquid-mixture that provides the desired zero-slump yet pumpable and workability properties for the resulting concrete; and in combination to take advantage of this short time period between mixing and placing concrete that is made possible by the volumetric mixing process, to allow the addition of set-accelerators in the concrete. Alternatively, the water supply for the volumetric mixing process can be modified inline, by injection and intermixing of an admixture, so modifying the water to become a similar liquid-mixture before it is mixed in with the other concrete constituents.

A delivery system is built to supply the liquid-mixture into the volumetric mixing process at the rate of delivery required to match the continuous batch rate of the volumetric system. The onboard water delivery system is already designed to meter water in this manner, but this system is not designed for the viscosity and suspended solids of the liquid-mixture, and does not provide for the liquid-mixture mixing process. This disclosure shows a separated mixing and delivery system, but of course it can be entirely onboard a volumetric mixing truck, in addition to the water delivery system.

A shorthand description of this process is the following: The liquid-mixture blending process takes place in a mixing tank 63, then is transferred to the fluid metering system 64, where the liquid-mixture is metered into a volumetric concrete mixing truck 66 where it is mixed with cement and aggregates in replacement of plain water, and a resulting zero-slump-pumpable concrete is directed into the concrete or grout pump 2, and then is pumped into place at the concrete wall 5.

A non-specific depiction of a volumetric concrete mixing truck 3 is presented because this invention is not about the existing volumetric mixers or the trucks. Any volumetric concrete mixing system, with or without a truck, can be utilized with this process of creating zero-slump-pumpable concrete on a continuous basis.

On this embodiment of the concrete mixing process, the volumetric concrete mixing truck 66 is unmodified and in normal operation, except that the water delivery to the concrete mix is shut off or redirected back to the water tank. As each cubic meter of this concrete needs roughly 75 gallons (284 L) of the liquid-mixture, depending upon the amount of suspended solids etc, there is a material handling issue with this process. The mixing tank 63 is required for blending the constituents of the liquid-mixture. It should preferably be a vertical cylindrical shape to facilitate mixing, and at least around 80 gallons (303 L) capacity, if a cubic meter's worth of concrete is the preferred amount per mixed batch of liquid-mixture.

A water supply 68 is required, as is each liquid-mixture constituent 69 that is to be used, all of which are described further below. A paddle mixer 70 with a vertical shaft and a one-half horsepower 1750 rpm motor will suffice. This has a low-shear mixing propeller suitable for mixing paint, or the like. Preferably it has multiple 3" (75 mm) minimum diameter propellers. A disclosure of the liquid-mixture design follows below, but here is information relevant to the mixing process: It is best to add the liquid-mixture constituents 69 that are surfactants or emulsifiers or plasticizers first, to help with, or at least not hurt, the wetting of the other dry constituents. Any alkali swellable emulsifiers (ASEs), super absorbent polymers (SAPs), or cellulosic or gum thickeners would preferably go in after the other constituents, as they bind up available water for wetting dry ingredients, slowing down this mixing process. The mixing time required is usually no more than 5 minutes beyond the time it takes to dispense and blend the various constituents into the water. That is 5 minutes beyond the time when the last liquids are added or the last solids are wet out by visual observation. Extra mixing is not a problem.

Once the mixing of the liquid-mixture is completed it could be batched into concrete directly, and a holding tank 65 could be omitted. However to continue mixing concrete to amounts beyond the mixing tank 63 capacity, a two tank system is required. This system allows liquid-mixture mixing and concrete batching to proceed simultaneously, where completed liquid-mixture is held in the holding tank 65 while it is metered into the concrete with the fluid metering system 64.

With the two tank system, the holding tank 65 should be at least the same size as the mixing tank 63, so its entire contents can be emptied into the holding tank 65. Bigger is better, so that the mixing tank 63 contents can be emptied before the holding tank 65 liquid-mixture is consumed into concrete. Of course a transfer pump 71 and fluid line 72 is required between the tanks. This pumping rate can be low and variable, and the total volume is relatively small, so many different pump types, not specifically meant for abrasives that may be in this liquid-mixture, will work OK. To suit any variation of the liquid-mixture, the transfer pump 71 would ideally be a small peristaltic pump, meant for slurry mixes, such as a Vector model 2002 with a ¼ hp motor minimum. For a mobile liquid-mixture delivery system on board the volumetric concrete mixing truck 66, this pump would preferably be hydraulically driven as is the normal water pump on such a truck.

Metering the liquid-mixture into the concrete mixing process is very important, in that an adjustable yet precise rate of flow must be achieved to control concrete slump with a slim margin of error, and the flow must be able to start and stop simultaneously with the concrete mixing. Also, this rate of flow must be relatively high, because the volumetric concrete mixing truck 66 typically makes concrete at a rate of up to or over a cubic yard a minute (cubic meter per 78 seconds), and so this liquid-mixture must correspondingly meter out at a rate of up to around 60 gallons per minute (227 L/min), to match the normally preferred rate of the volumetric mixing truck 66.

The fluid metering system 64 has these elements: the holding tank 65, a delivery pump 73, an actuated valve 74, a toggle switch 75, a flow meter 76, and a flow control valve 77. All elements of the fluid metering system 64 must be capable of delivering a fluid that is the liquid-mixture disclosed below Regarding the delivery pump 73: A preferred version of the liquid-mixture is technically a slurry with suspended solids at such a concentration, that the industry associates this slurry with the need for special pumps that are designed for the density and abrasiveness of these types of suspended solids, such as peristaltic pumps. As these types of pumps having acceptable rates of flow, such as 60 gpm (227 L/m), are large, heavy, and have electrical power requirements that are not available at most jobsites. More economically, residential sewage pumps work well for the liquid-mixture, both in terms of flow rate and durability. These are available as 120-volt versions. An example is the Zoeller N282 sewage pump that can pump 63 gpm (238 L/m) at a dynamic head of 15 feet (4.6 M). Another example is the Grindex Solid Pump, part number 81232810005. The sewage pumps have the disadvantage that they do not self prime and so must be located below the holding tank 65, and they need an inlet to be plumbed into them rather than their normal configuration as a sump pump. These pumps are designed for high viscosity but not specifically for abrasive solids; however as the pumping run time is only during the overall concrete mixing process, so they can hold off the negative effects of the abrasive solids for a sufficient number of jobs before the seals start to leak.

For a mobile liquid-mixture delivery system, the delivery pump 11 would preferably be hydraulically driven. A peristaltic pump, such as the Vector brand noted above, or progressive cavity pump such as those made by Netzsch, Seepex, or Moyno is preferred for long-term reliability such as for a stationary installation of the fluid metering system 64; but these types of pumps that have the required rate of flow will have electrical power demands that are difficult to meet at a typical jobsite. Alternatively, they can be hydraulically driven, and this is suitable for such mobile applications.

Regarding the actuated valve 74: A three-way solenoid-type valve is installed to direct the liquid-mixture to the volumetric mixing truck 66 when needed, and to redirect it back to the holding tank 65 for the periods when the concrete mixing process is paused. This type of valve system allows continuous flow of the fluid allowing instantaneous starting and stopping at the high flow rate, and it avoids forcing the delivery pump 73 to work against a dead head. Also while directing flow to the return line it agitates the liquid-mixture preventing settling of the solids, and in fact it can be switched to this direction occasionally just for this reason. A "CO-AX" brand model 5-VSVM-50-DR will work. This has 24-volt controlled, pneumatically driven switching of the valve. A 24-volt power supply is required. This valve allows nearly instantaneous redirecting of the fluid. The wired-remote toggle switch 75 for the 24-volts is operated along with the similar toggle switch connected to a volumetric mixing control panel 84. These two toggle switches are operated simultaneously. Of course these switches are preferably combined into one toggle switch for operational purposes, but the dual switch operation diagramed in this embodiment requires no modification to the volumetric concrete mixing truck 66.

Regarding the flow meter 76: The high flow rate, with a slurry of such potentially high-density, justifies the use of an electromagnetic type of flow meter, as this will not interfere with flow, and does not have any concerns of impellers getting fouled with the suspended solids. An Anderson-Negele IZMAG series, with a 50 mm diameter port will work. The plumbing from the holding tank 65 to this point is all 2" (50 mm) diameter, with smooth radius bends, to minimize flow resistance. This reduces dynamic head and maximizes the achievable flow rate from the delivery pump 73. The dynamic head loss at the required flow rate for a given pump will of course determine the required line size.

Regarding the flow control valve 77: This is simply a manual valve that can be incrementally adjusted to restrict the flow rate, allowing the rate to match the liquid/binder ratio that is required for the zero-slump-pumpable concrete. The resulting concrete fluid properties are compared to the flow meter 76 reading to establish the desired setting of the valve. This is the same simplistic technology that is presently used with the volumetric concrete mixing systems. A stainless steel ball valve is preferred.

The liquid-mixture must then be dispensed with the sand, aggregate, and cement in an auger mixer 80, shown cut away to reveal the auger. A fluid line 72' can attach to the same sprinkler head 79 that is normally used for water dispersion, and so reduced to the proper connecting diameter before this point of course, as these may be as small as 1¼" (32 mm) pipe. This sprinkler head 79 typically has large enough orifices to accommodate all the liquid-mixture ingredients contemplated here. Alternately, a separate sprinkler head for the liquid-mixture can be located and affixed appropriately at the top of the auger mixer 18.

A check valve 78 can be installed at the end of the fluid line 72' just before the sprinkler 79, so that liquid-mixture does not dribble out when concrete mixing is paused. As the liquid-mixture must be assumed to contain suspended solids, a one-way valve meant for sewage, also known as a "backwater" valve is preferred in this application for continued operation without blockage. If the existing sprinkler 79 is used, the line here would typically reduce down to 1¼" (32 mm), a Zoeller 30-0181 full-flow check valve is an appropriate choice.

As the concrete is dispensed from the auger mixer 80, it is directed into the intake hopper 81 of the concrete or grout pump 2. As the concrete is near to zero-slump at this point, a resulting problem is that it does not go down to the bottom of the intake hopper 81 without some help. This can accomplished with either be a conventional concrete vibrator, which is not shown, and is vibrated per usual practice; or the intake hopper 81 itself can be made to vibrate with a vibrator attachment 82, which can be clamped or fastened onto the side of the intake hopper 81. If a grating (not shown) is to be used at the top of the hopper, the attached vibrator must be located to also vibrate the grating in order to help the concrete to get through that. A high frequency vibrator in the range of 10,000 VPM, such as the Vibco US-450 electric vibrator is suitable for moving concrete. To prevent possible over-consolidation of the concrete, a suitable variable-frequency vibrator is the OLI Vibrator MVE.0021.36.115 external electric vibrator with the intensity controlled by the TruePower Electronic Stepless Speed Controller model 09-0123.

The concrete mix at this point does not need to be at zero-slump, and preferably is not at zero slump, yet. This is because the pumping process will reduce the slump, depending on the initial moisture level and porosity of the aggregates, and on the amount of distance and pressure incurred in pumping; adjustments must be made for these factors, on the order of about an inch or more of slump in most common situations. An initially very stiff mix made from dry porous aggregates will likely lock up very quickly and become totally unpumpable.

At this point the zero-slump-pumpable concrete is pushed by the concrete or grout pump 2 through a concrete pump hose 6, to be placed at the concrete wall 5 which has a number of a reinforcing bar 38 installed per building code or structural requirements. There is no limit to the aggregate size with regard to the performance of the zero-slump-pumpable concrete. The type of concrete pump 2 and size of the concrete pump hose 6 are the limiting constraints. Up to 150' (45M) lengths have been used successfully in tests with the 2" (50 mm) line using ⅜" (9 mm) aggregate.

The alternative method whereby a system is in place to inject admixture into the water supply, so creating a liquid-mixture for making a zero-slump-pumpable concrete mixture could otherwise be identical to the primary embodiment disclosed. The admixture must be metered accurately proportional to the water flow rate, at a proportion that can vary according to the admixture composition and concentration. This metering can be accomplished with any of the rate control means associated with the volumetric mixing system, or as disclosed per FIGS. 6-8. These type of pumps disclosed would be necessary with respect to metered fluid delivery, according to the admixture viscosity. As the admixture is injected into a water pressure line rather than concrete, the inline mixer can be of conventional technology, such as a Koflo 1-40-3-6-2 Pipe Mixer, by Cole-Parmer Instrument Co, LLC, 625 East Bunker Ct Vernon Hills, Ill. 60061.

FIG. 11

This shows an overview of the major components to show how they work as a concrete placement guidance system. A surface guide channel beam 111 is located and supported by a pair of a climbing bracket 85, the version shown here being a roller bearing climbing bracket 85B corresponding to beam version 111. Each bracket 85 of the various disclosed versions 85A, 85B and 85C, utilizes a similar frictional connection for vertical positional attachment to each of a vertical guide post 110. The beam 111 is generally transverse to each of the post 110.

Each post 110 is prepositioned at a predetermined distance from the proposed finished concrete surface 25'; those attachments and any bracing are not shown. Each bracket 85 is self-connected about each post 110, thus providing a frictional connection which can support the necessary weight, yet can slip upwards as needed for more concrete guidance, simply by lifting beam 111. Each bracket 85 then holds that new elevation by frictional contact with post 110, unless that friction is released to allow beam 111 to move back down. Concrete is typically placed in successive horizontal passes. The presence of beam 111 provides temporary containment of concrete fluid pressure allowing vibration of the concrete during placement, as needed for consolidation. For this, the concrete mixture must have the proper rheological properties to allow sufficient localized consolidation by vibration of the placed concrete, without unwanted displacement of the previously-placed concrete below it.

Beam must 111 be able to span without too much deformation between each post 110, in its weak axis, for loads from vibrating concrete confined by it. This prototype version is a cold-formed steel joist section having a beam web 112 that is 10" (25.4 mm) tall, and having a top and bottom beam flange 113 that is 3" (76 mm) wide, each having a flange lip 114 that is typically about 0.625" (16 mm) tall. This steel design thickness is typically at least 0.068" (1.73 mm), referred to as "14 gage", and will typically be of material specification ASTM A1003 Type H Grade 33 or 50, with an electrogalvanized finish per ASTM A653. This beam section will normally have a weak axis deflection of no more than 0.25" (6.5 mm) with a span of 14 feet (4.3M) between posts 110 while confining concrete being vibrated.

Beam 111 will slide horizontally through each bracket 85B, allowing it to cover more surface area horizontally beyond a given post 110, or to slide though to a third bracket 85B installed at a third post 110, allowing the concrete placement to continue uninterrupted. Bracket 85B allows this lateral movement in that the primary contact with beam 111 is by ball-bearing rollers that are arranged to run along the interior surfaces of the beam section. More specific detail of this assembly is disclosed in FIG. 13 below.

As the relative movement of bracket 85B requires the inside of lower flange 113 to remain mostly free of debris such as spilled concrete, allowing passage of the rollers, a flexible closure 90 is fitted to lower lip 114 by an inner flexible flange 106 and an outer flexible flange 107, both tightly fitting around lip 114. Bracket 85B has a main body 86 that creates a gap between a spine plate 91 and a connecting plate 92, allowing closure 90 to extend further upward along beam web 112. Closure 90 is preferably an extrusion of a soft vinyl compound, such as the material used in manufacture of vinyl base molding. It is preferably imparted with a camber curving toward, and so pressing against, beam web 112, and has the flexibility to clear each spine plate 91 where present.

Each post 110 can be a length of lumber 2×4 or 2×6 or similar laminated material or the like. Metal posts will also work; more discussion on this follows below. Post is not required to be vertical of course; it can also define a sloped planar surface. Each bracket 85 has a quick disassembly means to allow removal and reinstallation at a new post 110. Bracket 85 allows for tilting relative to post 110, allowing beam 111 to be out of horizontal, and so that the lifting of beam 111 need not be simultaneous at both posts. Subsequent drawing figures illustrate these design features. These systems define the surfaces of in-situ concrete independently of the means of placement of the concrete and they work with any means of placement. Conveyance of the concrete to its final placement can be accomplished by chute, wheelbarrow, overhead lift, conveyor belt, pneumatic means, etc, as well as by a pump. In a preferred embodiment, the invention allows pumping and placement of a cementitious mix including aggregate intermixed with an admixture onto a surface without employing compressed air or other pneumatic assistance methods and apparatus and does not utilize the introduction of a pressurized gas into the cementitious mix.

The beam 111 can slide laterally relative to each bracket 85 and so be shifted from one pair of the post 110 to another pair, or from any pair of posts to a third one then paired with one of the original two posts. The ease of this movement is made possible by the low friction elements and travel systems disclosed at the interface between the various embodiments of beam and bracket, allowing manual movement to be made during the time of concrete placement or shortly afterward. The short time period required for adequate set of the concrete as provided by the disclosures herein, allows movement of the beam before the concrete has hardened, making this movement possible by manual means. This includes the vertical movement that is performed as the beam is lifted, corresponding to the increasing height of concrete, whereby the state of thixotropy of the concrete allows the manual movement. Low friction devices can be included at the interface between post 110 and bracket 85, where this may be required for conditions of bigger and longer beams, that can benefit from the addition of such low-friction surfaces. In the test projects, these low-friction surfaces were not required for manual vertical movement of beam; the pliability of the set concrete was sufficient to allow the movement.

FIG. 12

FIG. 12 shows 3 orthogonal views of an external sliding climbing bracket 85A that works with a surface guide box beam 109. FIG. 12A is a view from above. FIG. 12B is a side view with section cut through box beam 109. FIG. 12C is a face view from the backside; it shows bracket in a released configuration for orthogonal clarity.

This embodiment of box beam 109 is of 0.120" (3 mm) wall thickness extruded aluminum, as a practical minimum, and is preferably type 6061-T6 temper, if available in the size preferred. The extrusion thickness is 2" (50 mm)

minimum for a suitable span between posts at around 8 ft (2.5M) apart, or 3" (75 mm) thickness for a suitable span of up to 12 ft (5.4M) apart. A beam depth of around 10" (250 mm) is suitable, but this can vary. A steel box beam would be similar, but with a wall thickness of around 0.060" (1.5 mm) or even down to 0.040" (1.0 mm) at minimum, depending on the beam size, span, and steel grade.

The major component of bracket 85A is a U-body 91 that is made by splitting a length of tubular steel such as a 3"×3" by 0.187" wall tube. Two of an edge plate guide 152, that are of 0.25" steel plate, are welded to fit top and bottom of beam 109; and to their outer edges is welded a keeper sheet 153, that is a piece of 16 gage (0.056") stainless steel, so creating an aperture to fit box beam 109. Keeper sheet 153 is preferably of minimal thickness as it protrudes into the defined concrete surface 25'. Beam 109 must be able to slide through this receptacle with minimal binding as bracket 85A tends to twist etc under lateral force, due to the eccentricity between the center of beam 109 and post 110 as beam 109 is pushed along its longitudinal axis. Thus to prevent binding, receptacle typically needs to be of a longer length aperture than thickness of beam 109, and preferably is of a length over twice the beam thickness. Aperture should be of a finished dimension that is at least 0.020" (0.50 mm) larger than maximum finished surfaces of box beam 109, all around, depending on surface finish materials. The sliding surfaces of beam are preferably all of a non-stick cladding 115, and the mating surfaces of bracket 85A are preferably of a similar non-stick cladding 115'. Cladding reduces binding friction and prevents hardened cement from adhering, but it is not required for the device to function. Cladding can be a self-adhesive-backed ultra-high molecular weight polyethylene (UHMWPE) or polytetrafluoroethylene (PTFE) plastic sheet. Such a UHMWPE, part number TC 312-10 having a thickness of 0.010" (0.25 mm), is made by TapeCase Ltd, 150 Gaylord St, Elk Grove Village, Ill. 60007. An example of a PTFE adhesive cladding is TC1821 PTFE Film Tape, also made by TapeCase Ltd. This has a 0.008" film of "Rulan" PTFE that is made for improved abrasion resistance. Thicker non-stick cladding surfaces can be fastened in place with flush-set screws or rivets. Thicker non-stick cladding that is reliably adhesive-bondable without fasteners is suitable for cladding 115' installed on bracket 85; disclosure for this material is given at FIG. 14. Such cladding 115' on u-body 151 surface contacting post 110 is to reduce friction for the lifting of beam 109; the need for this base on confining pressure generated with the concrete is vibrated. This is true for all variations of bracket 85 whether or not such cladding is shown.

Non-stick surfaces are necessary on box beam 109 to allow concrete and cement residue and particles to easily break loose of these surfaces as box beam 109 slides through aperture in bracket 85A. The non-stick property can be accomplished many other ways, such as with a non-stick epoxy-paint, or graffiti-proofing paint, meant for this purpose. One suitable example is "Wearlon Super F-6M", made by Plastic Maritime Corp, PO Box 2131, Wilton, N.Y., 12831. With all working surfaces of steel, a temporary non-stick coating can be reapplied as required, but this is not sufficient with plain aluminum surfaces. Other non-stick surface examples follow at FIGS. 13 and 14.

Bracket 85 must allow sliding fit of post 110, and also be designed to clamp tightly enough to post 110 to support necessary weight. The chosen dimensions of post 110 are critical to the making of the pinching mechanism of bracket 85. Two of a rotating arm 94, that are each pinned to body 151, are welded to a pinching bar 95. Both arm 94 and bar 95 are of 0.25"×0.75" steel bar, or the equivalent. Where arm 94 is perpendicular to body 151 there is sliding clearance for post 110. When arm 94 rotates upward to where pinching bar 95 makes contact with post 110, any subsequent movement downward of bracket increases that pinching action. Providing that the coefficient of friction between the surface of body 151 or edge of pinching bar 95, and post 110, is greater that the tangent of angle "b" shown in FIG. 12B and FIG. 13B, bracket will not slip downward when weight is applied. To be safe, it is best to anticipate a worst-case kinetic coefficient of friction. To be sure of this functionality, keeping angle "b" small is helpful; within the anticipated variation in milled lumber sizes which makes keeping angle "b" small more of a challenge.

In this example a 10 degree angle of contact "b" has a tangent of 0.176, and the unlubricated kinetic coefficient of friction between wood and steel is between 0.2 and 0.5. Using a typical width for an unseasoned 2×4 for the design of bracket, which is around 3.563", and adding ¹⁄₁₆" more for clearance, the change in size at 10 degrees is 3.625*[1−cos (10)]=0.055", which is that same ¹⁄₁₆" original clearance. This is tight tolerances for lumber, but in practice it works very well. For a seasoned 2×4, the post width should be about right at 3.5"; that same bracket design with an opening of 3.625" would then make contact at 15 degrees, a less-advantageous angle. The tangent of 15 degrees is 0.268, and the lowest end of the kinetic friction coefficient is 0.2, meaning that there is a theoretical chance that this bracket could slide if pushed downward. However this has never happened in practice, and the tendency for wood to physically indent where pinching bar 95 makes contact, makes this loss in functionality unlikely. The contacting surface of body 151 could be given appropriate relief to make unwanted slippage even less likely. However too much relief can make lifting bracket 85 difficult, and in fact practice has shown that a non-stick type of surface here can be preferable, as unwanted sliding has not been a problem. Use of a 2×6 for post 110 makes the geometry easier in that the proportionally longer arm 94 will open a larger space for movement. A 2×6 member for post 110 is not a usually required size for strength, but is generally straighter than a 2×4.

A very nice benefit of bracket 85 design is that the often-repeated upward motion is so easy. Simply push beam 109 (or 111 of FIG. 11) upward, and it stays. To keep pinching bar 95 clear of post 110 as bracket is pushed upward, each side of body has a stop block 100 that is welded into place where it prevents arm 94 from rotating below horizontal. Maximizing the horizontal distance between block 100 and each of a hinge pin 96, will of course make stop 100 more effective. The same mechanism of a pinching force on post 110 can be utilized for another anchoring device, either above or below the bracket; where this device anchoring point can be utilized as a fulcrum point below the beam, or as a lift attachment point above the beam. However as the general scale of the geometry definition hardware tested, the use of such additional anchor points has not been necessary. For larger scale applications of the hardware, use of such additional anchor points could prove to be very beneficial.

Guide post 110 could be of steel or aluminum. These coefficients of friction are generally higher than it is with wood. However there is really not a tendency for much physical indentation from pinching bar 95, so for these harder materials maintaining a target pinching angle of about 10 degrees from 90 is appropriate. As dimension tolerances are much tighter for metal verses wood, it is easier to maintain this more consistent design angle of contact with a given size of post.

As there may not be access to either end of any given post 110, bracket 85A must be able to disassemble and reconnect about a post. So each hinge pin 96' is removable, in this case is a ¼" diameter clevis type pin having a shoulder at the outer end, held in place with a retaining pin 98, which is known as a "spring pin" or a "hitch pin clip" in the US. Retaining pin 98 is located near the head of hinge pin 96' to stay at the exterior portion of body 151 for better access. A pin hub 97 is welded to body 151 as a means to provide a place to lock hinge pin 96' with retaining pin 98 at the exterior side of body 151. Hub 97 is preferably of about 0.120" (3.0 mm) wall thickness steel, or equal, and of a length that allows easy manual insertion of locking pin 98. The hole for this in both hub 97 and hinge pin 96' is oversized to facilitate the pinning process, as hinge pin 96' must be in the proper rotation to make the hole. To reduce friction in the motion of arm 94 and avoid interference with the fillet at the inside corner of body 151, a washer 99 is used as a spacer between body 151 and arm 94. Washer 99 should be tack-welded to either body or arm, so it does not get lost on the job, as bracket 85A will be disassembled frequently. Accordingly, retaining pin 98 can have a lanyard for that same purpose.

A spring 101 is utilized to make sure that pinching bar 95 makes contact with post 75 at all times unless bar 95 is pressed downward. It attaches with end hooks through holes drilled very near the corner of body 91 and bar 95. Spring 101 is necessary so that the pinching action of bar 95 is immediate; it is not meant to provide the all the friction to hold beam 74 up, but it helps engagement when load is very low, so that bracket 73 does not ever start to slide. Spring 101 should provide at least around 15 pounds of force when bar 95 is making contact with post 75. Springs used for this purpose are stainless steel with a spring constant of around 1 pound per 0.038" extension; this can vary considerably. Spring 101 must be durable in that it is the element that keeps arm 94 and pinch bar 95 assembly attached to body 91 when hinge pins 96' are removed; and the attachment hooks at each end of spring 101 should each be a durable mostly-closed loop, to stay in place. Hot-melt glue placed at the holes where spring 101 attaches is helpful to keep parts from separating when disassembled.

To help prevent snags with spring coils, and more importantly, to prevent unsafe snap-closing of arms 94 into body 151 when bracket 85A is slid off the end of a post 110, spring 101 is placed inside a hose shield 102, shown only in FIG. 12B. Hose shield 102 is of vinyl material, similar to a ½" diameter garden hose, of a length short enough to allow bar 95 to close against post 110.

FIG. 13

Figure 11:
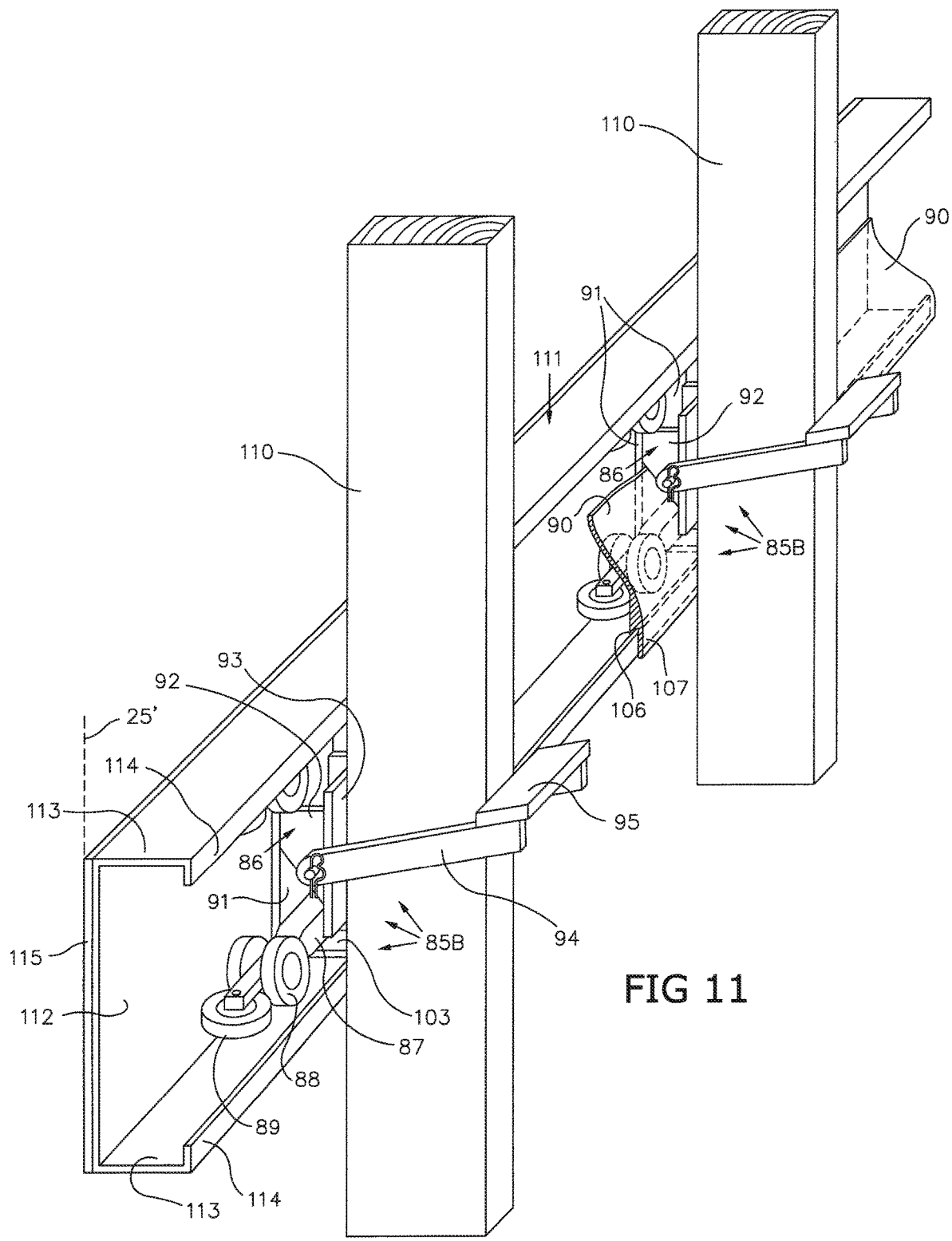
FIG. 11 shows devices of a system for defining and screeding-off a vertical or sloped surface of cast in-situ concrete.

FIG. 13 shows 3 orthogonal views of the roller bearing climbing bracket 85B shown in FIG. 11. FIG. 13A is a view from above with the obscuring top flange 113 of beam 111 removed. FIG. 13B is a side view with section cut through channel beam 111 and flexible closure 90. FIG. 13C is a face view from the backside with both obscuring flange lips 114 removed; it shows bracket 85B in released configuration for orthogonal clarity. Flexible closure 90 is removed from FIGS. 13A and 13C for clarity.

This model of bracket uses existing gate trolley roller-bearing assemblies, top and bottom, generally of stainless steel, and having also horizontal load resistance. Where the spine plate 91 mates with each of a trolley body 87, those are milled and machined as required to locate each pair of a vertical roller-bearing 88 at the inside face of beam flanges 113, top and bottom. Slotted holes are provided in plate 91 to allow vertical adjustment for best fit within beam 111; those holes preferably tapped in body 87 for tight frictional fastening. Each pair of the vertical roller-bearing must be held firmly in place to maintain stability in vertical of support of beam 111 as it is pushed laterally. Typically 0.25" (6 mm) stainless steel fasteners are used.

Concrete confinement pressure onto beam 111 is supported by four of a horizontal roller-bearing 89 that rolls on beam web 112. Stability of the horizontal support system is provided by each of a retainer block 103, that is fastened with adjustability into the far edge each trolley body 87, by slots in block 103 with tapped holes in body 87, so that block 103 is aligned to match the surface of each flange lip 114. As bracket 85B is twisted from a lateral force on beam 111, the distance between resulting horizontal contact points between bracket 85B and beam 111 is what provides support stability. The distance along the beam 111 axis, between the loaded horizontal roller-bearing 89 and corresponding the retainer block 103, is beneficial to reducing those torsion-resisting point loads when beam 111 is pushed laterally. That distance must be at least the width of flange 113, and twice that distance is better. Block 103 is preferably of UHMWPE for lubrication and abrasion resistance, and has a beveled edge at the point of contact with lip 114, making the contact point closer to flange 113, so that variations in bend angle of lip 114 will minimize problems with horizontal fit of bracket 85B in beam 111.

The mechanism shown on bracket 85B that clamps onto post 110 is mostly the same as that of 85A, so the disclosure of FIG. 12 is relevant, except that a single pin 96 can be used, as it does not interfere with post 110. With 85B relative rotation of beam 111 to post 110 is unrestricted by a flat face plate 93 in that the structure of main body 86 is accomplished by the depth of each connecting plate 92, each welded to face plate 93, that is within the confines of channel beam 111. Attached to face plate 93, is an optional closure block, also of UHMWPE or the like, and presenting a concave-cut edge to the flexible closure 90, so pressing it back to beam web 112 at each side of spine plate 91. Also shown is a bearing shield 104 to protect the upper set of exposed vertical roller-bearings 88 from damage due to exposure to wet concrete, etc. The material and geometry of shield are not critical and can vary to suit.

Cladding 115 is shown at the face of beam 111 presented to the concrete placement, and at the top flange 113. To minimize sticking to fresh concrete, this cladding can be of silicone-oil-filled UHMWPE such as "Duro-Glide", either "#319 VT Purple" or "354 Red Hot", both made by TSE Industries Inc, 370 112th Terrace North, Clearwater, Fla., 33762. A means of securely bonding such UHMWPE to the beam 111 without fasteners can be done if the material is modified by a process developed by LinkTech, Inc, 59648 M-43 Highway, Bangor, Mich., 49013-9617. This is where a composite-bondable material, such as fiberglass cloth, is effectively "welded" to the UHMWPE surface, allowing it to subsequently be bonded with adhesive, such as a suitable epoxy, to other substrate material, per the recommendations of Link Tech.

FIG. 14

Figures 14A, 14B, 14C:
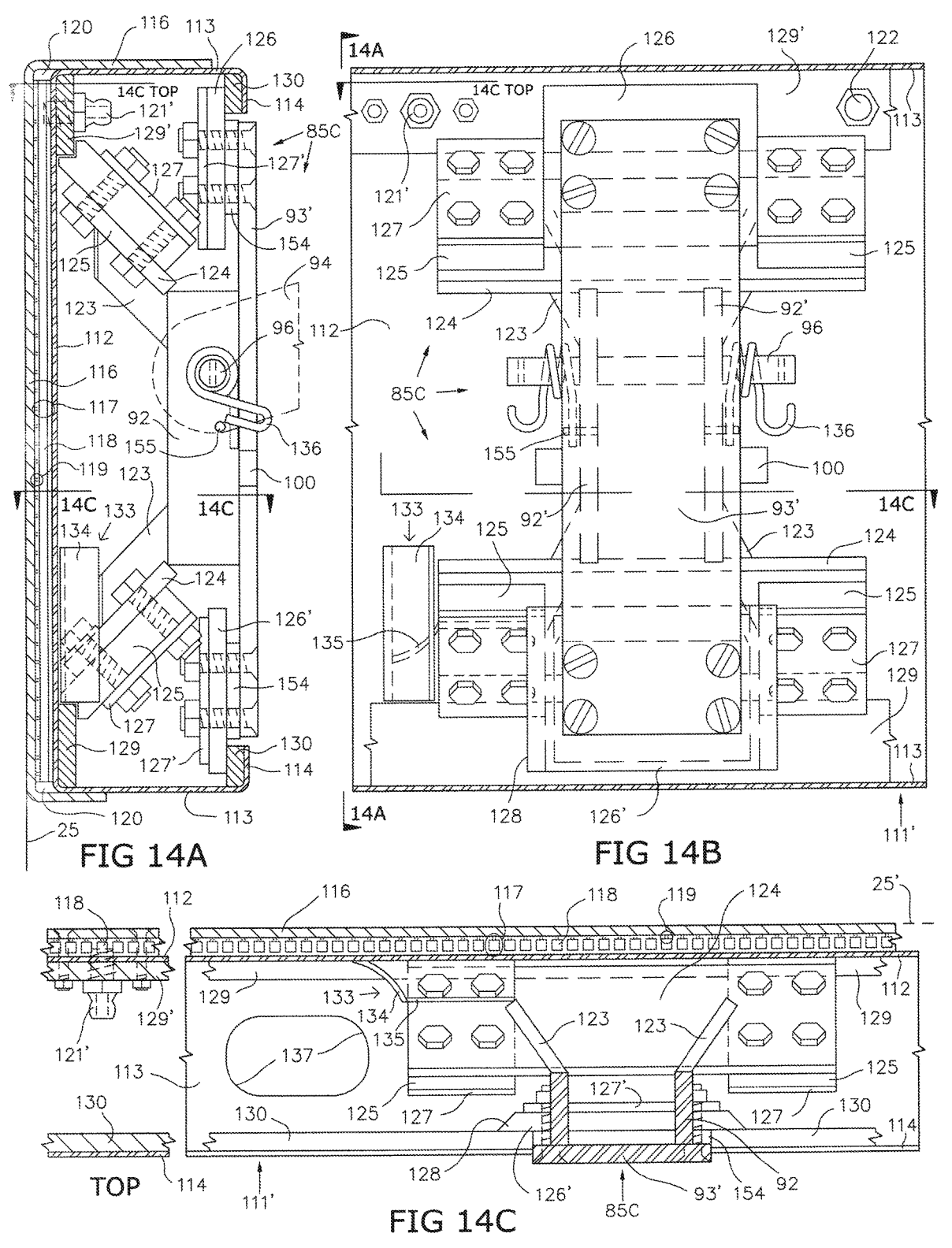

FIG. 14 shows 3 orthogonal views of an interior sliding climbing bracket 85C. FIG. 14A is a side view with section cut through a channel beam 111'. FIG. 14B is a face view from the backside with both obscuring flange lips 114 removed. FIG. 14C is a section view looking down, cut below mid-height of bracket 85C. Post 110 and the related clamping mechanism elements are removed for clarity with minor exception. Those removed elements are exactly as shown in FIG. 13 showing bracket 85B, except that a torsional spring 136 each side replaces tension spring 101.

Bracket 85C provides relative lateral movement by sliding on a set of rails in side of beam 111'. Bracket 85C geometry is arranged to generally provide clearance from the lower flange 113, so that small amounts of concrete falling inside of beam 111' will not impede that relative lateral movement. Lower flange 113 can also have a series of a flange hole 137, to help in removing the spilled concrete. Each flange hole 137 would be preferably centered within the weak neutral axis of beam 111', and kept within this zone enough to have minimal effect on that weak axis flexural resistance, such as ⅙ of the flange 113 width in each direction from the neutral axis. These design factors allow an open channel section to be utilized as beam 111' without a need for closure 90.

Guidance for beam 111' relative to bracket 85C is provided by an internal rail 129, top and bottom, and a flange rail 130, top and bottom. These rails are all of UHMWPE or Polyoxymethylene plastic material or the like. They can all be the UHMWPE material modified for epoxy bonding as disclosed at FIG. 13. In this case, they are all bonded in place with continuous fixture that matches the geometry of the corresponding guides of bracket 85C, and affixes the rails true to required locations; with allowance made for variations in lip 114 straightness in keeping flange rail 130 true as required with epoxy fillers. Inner rail 129 provides vertical support with its exposed outer edge, and horizontal alignment with the outer extent of its face. The location of its outer edge should be at least about 1.0" (25 mm) from bottom flange 113 to provide clearance from spilled concrete, but not more than about 1.5" (38 mm), as the horizontal force from concrete confining pressure too far from flange 113 will tend to distort web 112, depending on the beam 111' gage. Flange rail 130 is for supporting stabilizing horizontal forces, and the same geometry issues on distance between points of contact with beam with respect to resisting twisting forces on bracket 85C without developing excessive forces at those points of contact, as discussed with brackets 85A and 85B.

Bracket 85C provides vertical and confinement support for beam 111' with four of a sloped bearing block 125, which is preferably of silicone-oil-filled UHMWPE or PTFE or the like, and has an edge with a milled groove to fit exposed corner of inner rail 129. Block 125 is of sufficient thickness to provide strength at projections of that milled edge to sustain design loads without material failure. If the width of the milled grove is around ¼" (6 mm), then the total thickness of block should be at least ½" (12 mm) to provide this strength at those edges. Each block 125 is affixed to bracket 85C by means of a sloped flange 124, that is steel plate of about ¼" (6 mm) thickness that is welded to both if a connecting plate 92' and stiffened with both of a welded on gusset plate 123, all of similar material. Block is clamped in place with a clamping plate, of ⅛" (3 mm) steel or similar and four of a hex bolt or the like to provide alignment and clamping force. Block has slots at bolt locations allowing position adjustment for fit to rails of beam 111'.

A flange bearing plate 126 is of the same UHMWPE or PTFE material or the like, and is clamped to a face plate 93' with a clamping plate 127' and four flat head machine screws or the like, so that the surface of face plate 93' remains flat for post 110 to be in contact at any point of face plate 93'. Bearing plate 126' at the bottom flange lip 114 has two of a beveled edge 128, angled to clear residual spilled concrete from the face of flange guide 130, allowing passage of bearing plate 126' though such debris. Bearing plate 126' has horizontal adjustment by use of a compressible shim 154 so the fit to face of flange rail 130 can be adjusted by relative tension of those machine screws. These screws can preferably be replaced by threaded studs welded to face plate. Shim 154 is sized for fit to flange rail 130 as it is fixtured in location, and is of a rubber material having a durometer Shore A hardness of around 70 or so, to allow required minor position adjustment.

FIG. 14A shows partial outline of rotating arm 94 to show the function of each torsion spring 136 in providing lifting torsion to arm, to initiate clamping action to post 110 discussed previously. As each rotating arm 94 is pinned into place with pin 96, each spring 136 outer end is hooked under arm 94, then inner end of spring 136 is snapped into position between a locking pin 155 and face plate 93'. Connecting plates 92' are set back from the edges of face plate 93' to provide this space for the torsion springs. Each spring 136 can be one that provides a torsional force in the range of about one foot-pound (1.4 Nm) at the point of pinching bar 95 (FIG. 13) touching post 110.

An optional mud scraper 133 is attached to angled plate with fasteners also for angled bearing block 125, with a mounting flange 135. Scraper 133 has a curved blade 134 that functions as a snowplow blade in removing fresh concrete debris from that portion of beam web 112 and the top of inner rail 129, as beam 111' slides by bracket 85C. Scraper 133 would be of injection molded polyethylene or the like, of durometer Shore A hardness of over 90. It is easily replaceable if damaged. Alternatively, bearing block 125 can have a 'protruded" or beveled portion near corner of rail 129, similar to the beveled edge 128 of bearing plate 126', to help clear concrete debris from rail 129. Scraper 133 would be at each outer side of both lower angled bearing blocks; it is shown one side for clarity.

In that the zero-slump-pumpable concrete mix can be problematically very sticky in temporarily sticking to most any non-stick surface, beam 111' has an active non-stick surface built integrally into its face that defines the concrete surface 25. A cellular chamber 117 is adhered to the outer face of beam web 112. The chamber 117 is an extruded plastic cellular sheet product such as the polypropylene copolymer "Corroplast" made by the Coroplast company, 201 Industrial Park Rd, Vanceburg, Ky. 41179; or the polycarbonate "Polygal" made by Polygal Inc, 1100 Bond St, Charlotte, N.C. 28208. Each or these products contain a series of linear rectangular cells between two continuous surfaces, which can serve as channels for conveyance of the liquid "form release". These channels are oriented vertically, transverse to the axis of the beam. The thickness of cellular chamber 117 can range from 2 mm to 10 mm. The thickness need not be more than allows free flow of "form release" at a very low pressure. This may preferably be 3 mm or 4 mm for Corroplast. The thinnest Polygal is 6 mm, which also works.

The outer wall of the cells, at the outer surface of the cellular sheet, is perforated at regular close intervals to allow passage of a liquid that serves as "form release"; this can for example be 1/16" (1.5 mm) diameter holes at ¼" (6 mm) maximum on center, with the size and pattern dependent on the effective viscosity of the "form release" and other factors. Adhered over chamber is a permeable non-stick cladding 117. This can be a sheet of UHMWPE that is produced by sintering of the plastic particles, at a particle size and pressed density that allows porosity of the sheet; and the surfaces are skived, or the equivalent, to avoid any manufacturing surface effect that seals over the material pores. Many other porous thermoplastic materials will serve the purpose of cladding 117. The preferred thickness of permeable cladding 117 depends on its porosity, in that liquid of a given viscosity must pass through it at very low pressure. A UHMWPE prototype is made of ⅛" (3 mm) thick "DW 402P" made by DeWAL of 15 Ray Trainor Dr, Narragansett, R.I., 02882. This product has nominal void volume of 30%, and a "torturous" pore structure with a pore size distribution of 5 to 50 microns, is hydrophobic, oleophillic, and maintains a high abrasion resistance despite the porosity. Used with an oil-based or otherwise "phillic" liquid, this material will tend to absorb that liquid and repel the water-based concrete, so for example, that the material soaked with an oil-based "form release" under minimal fluid pressure from behind, will actively shed sticky concrete and cement. The effectiveness of this came as a surprise. This system has beneficial utility for many other of surfaces involved in concrete placement where cement sticking to those surfaces causes problems, delays, or additional labor.

Assembly of the non-stick surface system is preferably by use of permanent "adhesive transfer tape" resistant to whatever liquid may be used as form release. This could be a 468 MP or a VHB 4952, both made by 3M Company, St. Paul, Minn., 55144; either installed per the manufacturer. The tape needs to be attached to the outer surface of chamber 117 before the series of perforations are made in it. Chamber 117 top and bottom edges stop short of each flange 113, and cladding 116 wraps onto the outer side of each flange, and is adhered with the same type of tape or with a suitable adhesive compound. Fabricating the bends in this type of plastic is a known art. This layup creates an edge plenum 120 at each corner of the beam, allowing horizontal distribution of the liquid in order to reach all the perforated cells of chamber 117. The ends of each plenum are plugged with urethane caulking or the like, or a suitable orifice can be created to fit a removable plug of the various types that will work for this very low pressure, allowing drainage of the liquid if necessary.

A route of access for the liquid to reach the plenums can be created with a number of a check valve 121' that is also a common zerk fitting, with its internal spring of a cracking pressure of below 1 psi (7 kPa), threaded into a hole that is tapped through both beam web 112 and the top inner rail 129. To prevent delamination of the cladding 116 from internal pressure, at least one pressure relief valve 122 is installed. This can be something like a model #317400, with a cracking pressure from 0.25 psi to 1 psi (2 to 7 kPa), made by Alemite LLC, 5148 N. Hanley Rd, St. Louis, Mo. 63134. Relief valve 122 can be installed the same way as valve 121'. Plumbing the liquid to valve 121' can be done by the equivalent of a common grease gun, except that the pressure capacity of this type of tool is far too high, so a pressure-relief mechanism would need to be involved. For temporary slight localized overpressure, valve 121' can be accompanied by a number of fasteners that have flush heads helping to hold cladding tight at that area. As the pressure system is very low, a simple length of vinyl tubing that fits over valve 121' will suffice as a liquid delivery means, as shown in FIG. 15.

When the member defining a concrete surface is a channel profile, such as the surface guide channel beam 111 or 111', a significant advantage is provided in making the means of vertical and planar support, and lateral translation means, all internal to the member. This support and guidance system, being internal for this type of member, can then be away and significantly protected from the surfaces necessarily exposed to contact with hardening concrete, so avoiding that concrete material interfering with the functioning of these dynamic support systems.

FIG. 15

Adequate pressure to pass a "form release" liquid though the permeable non-stick cladding 116 can be achieved by elevating the liquid above the beam 111' with a gravity feed bag 143 or the like. For water, 1.2 feet (0.35 M) of head is 0.5 psi (3.4 kPa), so such a bag held a couple of feet above the beam, with a length of plastic tubing 146 connected to the check valve 121' of FIG. 14, will provide the required liquid pressure system. The tubing 146 is polyethylene hose or the like as is used for feeding drip irrigation systems, or similar. Alternatively, an "on board" pressure tank 139, which is the same as a common polyethylene "garden sprayer", with a hand pump 140, a fill port 141, and a manual relief valve 142, but is made of a size to fit between the beam web 112 and the bracket 85C (FIG. 14). The connecting plates 92' of bracket 85C (FIG. 14) can be made more slender, and the bracket can be modified otherwise as necessary, to allow this fit. The fastening to the beam web 112 is not unusual so is not shown for clarity. The pressure tank 139 is plumbed to the check valve 121, which can be something such as a model 6110201 ⅜" FPT having 0.5 psi cracking pressure, by Apollo Manufacturing LLC, 7911 Enterprise Drive, Mentor, Ohio, 44060. In this case the liquid is plumbed to the chamber 117 with a flanged inlet 156, that is preferably located where it does not interfere with relative action of bracket 85C, and preferably has a mounting flange with fasteners that also help prevent delamination of cladding 116. Liquid reaching any channel of chamber 117 will reach each of the plenums 120.

Beam 111' can also have a means of oscillation to help prevent it from sticking to fresh concrete, as opposed to the usual higher frequency vibration used for concrete that may tend to slump freshly placed concrete that is already below the beam, causing unwanted distortion of that concrete wall surface. This oscillation would preferably be in the frequency range of 10 s to 100 s of VPM, contrasted to concrete vibrators that operate in the 1000 s of VPM. The object here being to simply move the beam slightly back and forth along its axis—even a small amount, so breaking adhesion with the concrete while minimizing disturbance of it. There are many suitable electric and pneumatic oscillators available for this, but they generally do not fit between beam web 112 and bracket 85C, so would need to be removable for when the beam is moved. A pneumatic inline sander 147 can be made to fit in this space by cutting down the width of a normal inline sanding pad 148, and then the pad is securely fastened to beam web 112. A variable speed version of the inline sander, item #13747 marketed by the Eastwood Company, 263 Shoemaker Road, Pottstown, Pa. 19464, will allow the VPM to be optimized for minimizing sticking and unwanted settlement of concrete. The relative amplitude of beam oscillation can be adjusted by adding a number of a lead weight 150 to sander 147, each preferably sized to fit inside of bracket 85C. A pneumatic hose 149 runs out to an air supply. The sander position is shown relatively low in FIG. 15 to prevent the upper flange 113 and lip 114 from obscuring it. Drawing items not disclosed here are of FIG. 14 description.

FIG. 16A

A drip system for dispensing "form release" over the surface of cladding 116 is created by making a gap 157 between a top cladding 115' having a continuous notch near the edge, and the cladding 115 or permeable cladding 116, having an upper edge that is held back from connecting with top cladding 115', so creating a gap 157. Cladding 115 or 116 can also have a notch along the top edge, if it facilitates fit of a length of perforated tubing 158. Tubing 158 can be the same as the tubing 146 attached to bag 143, except that it has a plurality of small perforations, as would a "soaker hose", but more frequent. Tubing 158 can alternatively be of an extruded section of Polyethylene or the like, shaped to fit a particular slot between the two cladding members. The "form release" leaks out at a rate controlled by its viscosity, pressure, and also by choices made for the size and number of perforations in tubing 158. "Form release" then seeps down the surface of cladding 115 or 116 from gravity. The continued upward movement of beam 111 against concrete also has the effect of drawing the "form release" down the face of the cladding. This cladding is given the two numerical references in that it can be preferable to be the hard smooth UHMWPE or the like, or to be a porous hydrophobic and oleophilic, sintered, skived UHMWPE. The latter material will absorb and become saturated with an oil-based "form release" and so will tend to repel any water-based cement material. This application applies to all variations of beam, 109, 111, 111', etc. The top cladding 115' is highly preferred to protect tubing 158 from damage by the concrete hose tail 6' (FIG. 1).

There is a wide range of degree of porosity in thermoplastic materials such as UHMWPE, and an effective amount of porosity can appear deceptively solid and impervious. For example, the base material for snow boards etc has differing porosity related to a preference for hot wax absorption. Rental skis for beginners tend to have a smooth solid UHMWPE base material that does not significantly absorb wax, and performs satisfactorily for most of those skiers without any wax. Racing skis and higher performance snow boards have a sintered porous UHMWPE base that absorbs and holds ski wax very well, so that their performance can be tailored optimally for specific snow conditions. An example of this is the "Durasurf" 2001 or 4001 base material; both made by Crown Plastics CO. Inc, 116 May Drive, Harrison, Ohio, 45030. It is an almost indiscernible difference between solid and porous ski base materials; they both seem to be a very solid non-porous plastic base, but the Durasurf type of material will act as a membrane or as a substrate that disperses "form release". As its porosity is less than the DW 402P UHMWPE discussed above, the permeability is less, or the thickness would need to be less to have similarly behavior as a membrane. The permeability (wax absorption) of Durasurf is kept as a trade secret. The material is typically "flamed" on one side—which is to seal the porosity to improve bonding to the snow board. This reduces permeability; so for this purpose unflamed material is preferable and if the material is post-process skived that will increase permeability beneficially.

Perforated tubing 158 is preferably replaceable. Blockages can occur, created from particles in the "form release", or from back-pressure of concrete confinement pushing cement back into the gap 157. If perforated tubing 158 is easily removed, this allows the clearing of gap 157 of cement particles etc with an appropriate bladed tool or one shaped to match the tubing-fit void; and then tubing 158 can be replaced by either sliding a length in from one end, or pressing a length in through the gap 157, providing it is sized to fit the compressed tubing. Tubing 158 can be normal irrigation drip line, such as the common ¼" (6 mm) diameter polyethylene tubing, except that perforations meant for drip emitters are simply perforations, and they are at much more frequent intervals, such as 1" (25 mm) on center. Perforations can preferably have spacings over a spectrum that decreases as distance from liquid source increases, to provide more uniform distribution of "form release" over length of beam at the low pressure system. The range of spacings can be from about ½" or 2" (12 mm to 50 mm) at the supply end, to as close as about ½" to ¼" (12 mm to 6 mm) at the terminal end, and spacings between that in between both ends. Experimentation is necessary for a given "form release" viscosity and liquid head. Normal drip irrigation barbed fittings are typically suitable for joining or plugging these types of hoses.

FIG. 16B

The term "form release" has been in quotes because it may or may not be a form release agent; more generally it is a liquid non-stick agent. For some conditions it is preferably a cement retarding agent to give the concrete surface a longer working time, such as those agents used with sculpting decorative concrete surfaces; or as the concrete placed in this way is exposed to sun and air, and so it benefits from the use of a liquid curing agent formulated to minimize evaporation at the exposed surface. There are suitable form release agents meant for traditional forms, and other suitable ones meant for use with polyurethane stamps or rollers for texturing concrete surfaces. Plain water can serve these types of purposes in hot and dry conditions, or just because the surface of this zero-slump low water/cement ratio concrete mix becomes more workable with more water. In this case one simply needs connect a water supply 68 to a garden hose in order to supply the active non-stick system. A pressure regulator 161 may be preferable or required rather than simply turning the water flow rate very low; and in most cases it is necessary with the channel chamber 117 system (FIG. 14), where fluid pressure needs to be kept very low to prevent delamination of the cladding 116. The pressure regulator 161 can be something such as a model P60-M1-A by Watts Water Technologies, Inc, 815 Chestnut Street, North Andover, Mass. 01845. The "A" suffix indicates having a pressure spring meant for low pressure at low flow rates.

When plain water or a water-based non-stick agent is used, and that agent has saturated the porous cladding 116, the cement at that surface, which is a very concentrated solute, will draw the less concentrated solvent—mostly water in this case—out of the cladding 116, by the process of osmosis. This osmotic pressure tendency will continuously separate the cement from the cladding, providing that a continuous source of water is available. This process works to prevent cement from sticking whenever cladding 116 has the continuous supply of water or water-based agent, whether the water or agent is available to saturate the cladding, with or without the chamber 117 of FIGS. 14 and 15. In the case with the chamber 117, a very low pressure of the non-stick agent need be applied for functionality, as the osmotic process will create liquid flow toward the cement, without fluid pressure applied.

Where the cladding 116 is of an oleophilic porous material, and the non-stick agent is oil-based, there is a tendency for the cladding to selectively absorb the oil-based agent and repel the water-based cement. This effect of selectively absorbing a preferred agent and repelling the water-based ionic cement solution will also work with lipid and polyol liquids, such as glycerol, as they are non-polar. So a continuous source of this type of agents is made available for absorbing into the porous cladding, and so then causing a sacrificial non-stick mechanism. Or a continuous source of this type of agent is made available via the chamber 117 on the backside of the cladding 116, which then acts as a selective membrane allowing the agent to pass though toward the concrete, again causing a sacrificial non-stick mechanism.

When the water supply 68 is used, a more concentrated version of a cement retarder or a curing compound or a non-stick agent or the like can be included in solution with the supplied water, with use of an inline proportional doser 159, such as a "Minidos" model 112602 or 112620. The doser 159 choice depends upon the preferred water flow rate, dose ratio and pressure capacity of the active non-stick system, etc. These dosers use source water pressure to power the proportional dosing, so typically the pressure regulator 161 would then best be downstream. There are many other varied makes, types and models of dosers to select from; however the venturi types would tend to be adversely affected by backpressure related to the active non-stick system. The preferable size of a concentrate container 160 depends on the dose proportion, etc. A common five-gallon (19 L) pail is typically fine. All elements of this system need protection from solid particles that can get into the concentrate or even the water supply. Necessary inline filters and check valves etc are not shown, but should be in place per usual practice as needed at any stage of the system, and per the recommendations of the manufacturer of the flow control hardware selected.

Admixture

The use of a relatively low dose of the admixture is preferable in terms of a reduced amount of material handling outside of the traditional concrete batching process. As concrete batching methods are generally very cost efficient in terms of cost per unit of material relative to retail or online types of material distributions, it is generally much more cost efficient to rely as much as possible on concrete delivery systems, whether by batching plant or volumetric mixer. Given these cost factors, a primary benefit of the admixture is to be as effective in thickening as possible at a low dose, and to achieve this, the thickening agent in the admixture is preferably as concentrated as possible. With respect to cement accelerators, a high concentration can be easily included in a liquid form, and this technology is developed by the shotcrete industry in use with both liquid and dissolved-salt accelerators. This list includes dissolved salts of aluminum sulfate, calcium nitrate, calcium chloride, etc.

With respect to a thickener, thoxotrope, rheology modifier, or similar agent that effects aqueous compositions such as concrete, there is a problem in that the admixture cannot be very quickly intermixed within a line of pumped concrete unless it is in liquid form. An aqueous admixture with a high concentration of such a thickening agent, which is in an active state of effect, the effect within the admixture itself will create a problematic viscosity for delivering that admixture. So it is preferable that the thickening effect within the admixture does not take effect until introduction to the concrete. This mechanism can be one such as a thickening effect that is based on environmental conditions. For example, use a low viscosity alkali swellable emulsion (ASE), or a hydrophobic alkali swellable emulsion (HASE), where an extreme thickening effect is activated by introduction to a higher pH environment, such as a pH of 8 or higher. Low doses of such an agent within an aqueous environment like concrete, where the pH is generally above 11, can have a significant thickening effect. An example of such a powerful alkali swellable agent is "Tychem 68710", an anionic carboxylated styrene butadiene copolymer alkali swellable thickener, made by Mallard Creek Polymers, 2800 Morehead Road, Charlotte, N.C., USA, 28262. It provides extremely high thickening of aqueous solutions when the pH exceeds 8.0; the admixture composition using this mechanism must of course have a native pH lower than that. Another mechanism for thickening action upon introduction to portland cement is a thickening agent that activates upon introduction to such an ionic aqueous solution. An example of such a concentrated thixotrope is "Acti-Gel 208", a highly purified hydrous magnesium aluminum-silicate attapulgite clay, made by Active Minerals International, Inc, 6055 Lakeside Commons Drive, Suite 315, Macon, Ga., USA, 31210. This product is available in a slurry form that is particularly activated by the ionic aqueous solution of portland cement, immediately providing thixotropy. These examples are types of rheology control agents utilized in oil-drilling fluid-control and well-cementing; many of these various types of rheology control agents also have useful application to this invention.

A novel thickening regime for an injectable admixture such as this, is to take advantage of water-miscible liquids that will accept high amounts of water-activated thickeners without reacting with them. The miscible liquid acts as a fluid carrier of the thickener, to deliver it into the concrete. This allows very a high concentration of a very powerful thickener, such as a dispersible powder thickener, to be stable and unreactive at a very high concentration, to be in a liquid form and remaining so at a low enough viscosity to be deliverable into the concrete mix by means of the metering technologies disclosed herein. This type of a composition allows a more reliable and durable means of thickening to be delivered to the concrete, in that this regime develops a more robust type of thickening, for any so injectable composition. The thickening developed in this way will have less effect of viscosity loss from over mixing, or hysteresis, than with thickening based on pH or ionic solution strength, it will have sustainability with increased thickening as initial cement hydration proceeds, and it can have a broader range of dose ratio where the resulting concrete will be both zero-slump and pumpable.

Very pronounced thickening of large amounts of concrete can be developed with very low doses of an injected liquid admixture of this type of composition. As very powerful thickeners can be effectively "hidden" or "masked" within a liquid carrier, this allows their injection, intermixing, and dispersement more thoroughly throughout the concrete mix. As the powerful thickeners are also provided with a means of delay in their effect, in that their suspension within the miscible liquid is increasingly penetrated by the concrete mix over time per that liquid miscibility, during intermixing, pumping and placement. Without this masking or powerful thickeners, an immediate and pronounced thickening would prevent a thorough enough intermixing, in that an immediate thickening action prevents further disbursement; and the resulting concrete mix will be lumpy and inconsistent, and the strength and hydration will also be inconsistent, negatively affecting strength. The combination of these mechanisms, masking and delay, allows a much stronger and more consistent thickening effect to be imparted into the concrete. The miscible liquid as a carrier provides both a masking of the thickener, and a delay of the thickening effect. Without the masking, such very powerful thickeners could not be successfully introduced by injection, and without the delay, a preferred amount of thickening would not be possible without causing blockage of the pumping line and other negative effects.

The thickening powder carried by the miscible liquid can be a cellulose ether, such as methylcellulose or hydroxypropyl methylcellulose, or the like. It can be a processed-cellulose rheology modifier manufactured for cement-based adhesives intended for vertical surfaces, such as the EBM, EBS, RHEMO, BCM, or MT series, by Akzo Nobel Functional Chemicals LLC, 281 Fields Lane, Brewster, N.Y. 10509-2676, USA. The powder can be a Vinyl Acetate-Ethylene copolymer (VAE) or Poly Vinyl Alcohol (PVOH) or Poly Vinyl Acetate (PVA) or the like. An example is "DA-1120" VAE redisbursible powder, by Dairen Chemical Corp, 9th Floor, No. 301, Song Kiang Road 104, Taipei, Taiwan. Or it can be another organic compound such as one of the ELOTEX series, also by Akzo Nobel. An example is FX 5300, which is a vinyl acetate, vinyl versatate, acrylate and ethylene based redispersible binder that is used for adding thixotropy to cement-based tile adhesives. The thickener can be a polysaccharide, such as whelen gum, diutan gum, guar gum, alginic acid, xanthan gum, etc. An example is "Kelco-Crete", a diutan gum made for cement-based products, by CP Kelco, Cumberland Center II, 3100 Cumberland Boulevard, Suite 600, Atlanta, Ga., 30339, USA. The thickener can be starch based, such as those from arrowroot, cornstarch, katakuri starch, potato starch, sago, cassava, etc. An example of a suitable starch thickener manufactured for cement products, is one of the ELOSET series, variations of carbohydrate starch ether disbursible powders, such as ELOSET 393 or 542, also by Akzo Nobel. Also, many different super absorbent polymer (SAP) powders can be used with very effective thickening effect at a low dose, along with more refined versions of the polyacrylic acid (PAA) thickeners can also be used with great success, such as Carbopol 940 NF polyacrylic acid made by The Lubrizol Corporation, 29400 Lakeland Boulevard, Wickliffe, Ohio, 44092, USA. The SAP thickeners also have the benefit of providing internal hydration that improves the curing of concrete. Variations of SAP used for this purpose include those made of a poly-acrylic acid sodium salt, polyacrylamide copolymer, ethylene maleic anhydride copolymer, cross-linked carboxymethylcellulose, polyvinyl alcohol copolymers, cross-linked polyethylene oxide, or starch grafted copolymer of polyacrylonitrile. The most common variation utilized for internal curing of concrete is the poly-acrylic acid sodium salt, and as this type of polymer will absorb hundreds of times its weight in water, very small doses are required for thickening as a component of this admixture.

Another type of thickener that can be used is a fine-milled clay, such as the dry version of the Acti-Gel 208 mentioned, or a similar processed attapulgite, palygorskite, sepeolite, metakaolin, bentonite, or similar type of clay, such as is used by the oil industry for controlling rheology of drill lubricating fluids, or by the coating and adhesives manufacturers, or by the shotcrete industry. One property of the thickener that may be preferred, is that it will not react to some proportion of water within the miscible liquid of the admixture, where such an amount of water may be necessary to pre-dissolve a mineral-salt-based cement set-accelerator, should that be desired. Two or more types of thickeners can be appropriately be combined in this composition, as a combined effect can have a greater robustness of the thickening action, and in fact using these products in combination is often recommended by the manufacturers. And any of the other thicker regimes disclosed or incorporated by reference can also be viable in combination the miscible liquid thickening regime. Such compatibilities must be investigated; for example the Acti-Gel 208 slurry will tend to activate in the presence of mineral salt cement accelerators, and the resulting admixture may become too thick to inject and intermix as a liquid. The polyacrylic acid thickeners will tend to swell, at least slowly, if any amount of water is present in the admixture.

The liquid carrier must be compatible with the selected powdered thickener, in that it allows smooth and thorough dispersement throughout the carrier, and it must be miscible enough with water to immerse the carried thickener into the aqueous cement solution of the concrete, for thorough thickening effect. Also, the carrier must not seal the thickener in a manner so preventing thickening reaction at the subsequent exposure to the aqueous cement solution. Many of the miscible alcohols can be suitable carriers depending upon the thickener(s) selected, and other factors mentioned. Suitable monohydric alcohols would include methanol, ethanol, propan-2-ol (isopropyl alcohol), butan-1-ol, (butyl alcohol). Suitable polyhydric alcohols would include ethane-1,2-diol (ethylene glycol), propane-1,2-diol (propylene glycol), and propane-1,2,3-triol (glycerol), except that the toxicity of ethylene glycol makes it undesirable. Suitable unsaturated aliphatic alcohols would include prop-2-ene-1-ol (allyl alcohol) and prop-2-yn-1-ol (propargyl alcohol). Suitable carriers include more complex organic compound variations such as dipropylene glycol (DPG), 4-oxa-2,6-heptandiol, 2-(2-hydroxy-propoxy)-propan-1-ol, and 2-(2-hydroxy-1-methyl-ethoxy)-propan-1-ol; and polyethylene glycol (PEG), H—(O—$CH_2$—$CH_2$)$_n$—OH, with the variations of PEG being the water-miscible ones such as the low molecular weight variation, PEG 400; and even some emulsifiers such as the polysorbates, such as polysorbate-20. The compatibility of the liquid carrier with the preferred thickeners is essential, and this needs to be tested. Specifically, the composition stability needs to be verified for the time period needed for use; and the effect in concrete needs to be tested to determine the dose, to establish the relative metering rate, and determination of any negative effects.

As an example, the admixture can be as simple as one thickener in one miscible liquid. This can be most any of the starch-based rheology modifiers by Akzo Nobel listed above; the choice for this example is ELOSET 393. The miscible liquid choice for this example is propylene glycol, even though it does have a retarding effect on the cement hardening. Some other miscible liquids have better rheology effect with less retardation effect, such as the polyethylene glycols or the dipropylene glycols; however propylene glycol is very inexpensive and it serves this miscible-carrier purpose well, and like the others, it serves beneficially as a shrinkage reduction agent for concrete. Measured by weight, an example of a most simple admix in this regime can be one that is 30% ELOSET 393 and 70% propylene glycol. This very simple composition will have pronounced thickening of concrete when injected and intermixed at around 1% to 4% of the concrete by weight, with 2% addition being a good target value. The 2% addition is in the range of around 40 pounds per cubic yard (24 kilos per cubic meter), but this depends significantly on the concrete mix factors and weather conditions. This admixture has the robustness to provide an acceptable range of thickening with a relatively wide range of dose ratios. As this admix has a retarding effect on the cement hardening, the build-up of taller walls, or situations where the placed concrete requires early strength development, a change to this admixture is warranted. However, for walls where early strength is not important or for decorative and sculpted faux-stone walls, a retardation effect is generally preferred to allow time for the continued manipulation, and this simple admixture also provides that benefit. For these and other applications, any negative effect of propylene glycol on strength development can be offset with a polymer resin, such as a styrene butadiene or acrylic resin, as is typically used for strengthening or bonding of concrete and cement products, and is commonly utilized for such decorative walls. These types of resins can be included in this admixture. Like any constituent, the capability with the other constituents should be tested. Also, there can be benefit in replacing some of this type of starch-based thickener with another type of thickener, such as a cellulose-based thickener. For example the 30% total of ELOSET 393 can be reduced by half, to 15% or so, with another 15% or so of RHEMO 500, also by Akzo Nobel. This blend can be expected to have greater robustness with respect to dose ratio, amount of intermixing provided, and consistency of effects over more extended time periods; although the first admix composition is really good enough in these respects. The starch-based thickeners tend to separate from the liquid more than the cellulose-based, but remixing will remedy this. The cellulose-based tend to react with propylene glycol to thicken, but less so with other carriers such as PEG 400, or DPG, or even polysorbate 20.

Where faster hardening of the concrete is preferred, as will often be the case, the simple admixture can also include a set accelerator such as a solution of aluminum sulfate in water. In this case, the aluminum sulfate is first dissolved in water at a ratio of 1 part, or 33%, aluminum sulfate to 2 parts, or 67%, water. The precise ratio is not important; the goal is to achieve a near maximum concentration solution at room temperature. After complete dissolution, this solution is then added to the original admixture composition at proportions up to around 33% of final admixture. A useful amount is 10%. At 10%, the mix would be 63% propylene glycol, 27% ELOSET 393, and 10% aluminum sulfate solution, by weight. With that solution breakdown, the water is around 6.7% and the aluminum sulfate is about 3.3% of the total admixture, by weight. For this composition, the presence of water with many of these thickeners may cause a slow thickening reaction with the admixture. The increasing thickening, if it is an issue, can be eliminated where the aluminum sulfate is replaced by use of an organic or non-aqueous accelerator such as Diethanolamine or Triethanolamine, or the like, as they are utilized by admixture manufacturers to offset retardation caused by high range water reducers. The possible permutations of carrier and thickener combinations disclosed herein is into the many hundreds of possibilities, and not all of them have been tested. It is the case that most of the combinations tested work to make a composition that allows thickening and rheology control of concrete may the means of injection and intermixing. Where the combination of these components does not work, it is typically a case of the thickening agent reacting with the carrier causing the admixture to thicken too much for a fluid delivery means. The other most common compatibility problem is where the thickening agent will react with any amount of water in the mix, and so an aqueous accelerator cannot be used, such as PAAs typically cannot be used with any water in the admixture. The other thickener types, such as those that react to pH and ionic solution strength, will often have premature thickening reactions with various mineral salts, etc.

Charts are presented for simple examples of the thickening admixture. These show only the use of propylene glycol as the liquid carrier. This is not the best performing liquid to add to a portland cement mix in that it retards the hardening of the cement and does not add strength, but it is significantly less expensive than some of the other choices, and it does also serve as a shrinkage reducer. The starch-based thickener is shown here because it tends to be more compatible than a cellulose-based is with propylene glycol, while the organic thickeners tend to be more expensive or may not be compatible with water or a mineral salt in the admixture.

| A VERY SIMPLE ADMIXTURE | |
| --- | --- |
| PROPYLENE GLYCOL | 70% |
| STARCH ETHER THICKENER | 30% |
| TOTAL | 100% |

| AN ADMIXTURE WITH SET ACCELERATOR | |
| --- | --- |
| PROPYLENE GLYCOL | 63% |
| STARCH ETHER THICKENER | 27% |
| WATER | 7% |
| CALCIUM SULFATE | 3% |
| TOTAL | 100% |

| AN ADMIXTURE FOR INDUCING A FALSE SET | |
| --- | --- |
| PROPYLENE GLYCOL | 66% |
| STARCH ETHER THICKENER | 28% |
| CALCIUM SULFATE HEMIHYDRATE | 6% |
| TOTAL | 100% |

Another effect that can be imparted with the injected admixture is one of a pronounced false set of the concrete. A false set is a condition where there is rapid growth of enttringite crystals shortly after hydration begins, causing a rapid stiffening of the concrete mix. The effects of a false set are eliminated by manipulation of the concrete, such as with pumping or vibration, but they can reestablish upon leaving the concrete static, so inducing a false set can be very beneficial to a zero-slump-pumpable concrete mix composition. Most often the tendency of portland cement to have a false set is where the amount of added gypsum is too high, or the gypsum is more dehydrated by conversion to the hemi-hydrate and anhydrous forms of calcium sulfate during the cement kilning process. In the case of the present means of injection and intermixing of the concrete, only gypsum, the calcium sulfate dihydrate form, is practical for use as a constituent to induce a false set where water is present in the admixture, in that the other forms (plaster) will rapidly set up within the admixture having water. However with this new type of admixture composition where water-reacting agents are masked with an alcohol or the like, and in the case where the admixture composition has no water in it, the dehydrated forms of calcium sulfate can be utilized for greater effect to induce a false set, and at a smaller dose than can be done with the gypsum. The smaller dose of calcium sulfate will have less tendency for concrete brittleness and for any sulfate-related deterioration later on. To induce a degree of a false set, the example admixture above that includes the aluminum sulfate can have around 12% of gypsum included; and the first example that is just carrier and thickener, can have 6% or so calcium sulfate hemihydrate. These amounts can be increased significantly, but the compatibility in terms of the admix setting up can become more of an issue. The admixture compositions containing some water can actually remain stable, without setting up, with the addition of calcium sulfate hemihydrate at a low dose, providing the mineral saturation of the water is sufficient, and the amount of water is low enough, to prevent hydration of the calcium sulfate hemihydrate. Products marketed as "paster of paris" can be a dry-mix castable composition of calcium sulfate hemihydrate combined with calcium carbonate and crystalline silica. Plaster of paris can substitute for calcium sulfate hemihydrate, but testing for compatibility needs to be performed.

Methods, systems, and devices, are developed for creating a means of in-situ placement of a concrete mix that can have the thixotropy to hold vertical dimension without containment, while maintaining pliability to be pumped into place and manipulated to a desired shape, and can be combined with concrete set accelerators, allowing subsequent layers of this concrete mix to be continuously stacked in place to build tall walls and such without the use of forms. Concrete without these special properties is pumped toward the point of placement where it is modified by injecting and mixing, into that line of pumped concrete, an admixture containing thixotropes, thickeners and/or set accelerators or other modifiers to provide these properties and other improvements. This method allows conventional plant batching with commonly available constituent materials for batching an economical concrete that is delivered to a jobsite and then is pumped most of the way to a point of placement, before inline modification; allowing minimal conveyance and pumping of a zero-slump and set-accelerated concrete mix, avoiding difficulties and risk associated with pumping such a modified concrete mix. Various means of metering the injection of the admixture flow rate to correspond proportionally to the concrete flow rate are also disclosed. Alternatively a means for modifying a volumetric concrete batching and mixing system to achieve the same result is disclosed. A system is disclosed for defining a vertical or sloped concrete surface utilizing a movable beam attached to guide elements with sliding brackets, with the beam contact surface optionally having an active non-stick system.

In the foregoing specification, the invention has been described with reference to specific embodiments; however, one of ordinary skill in the art appreciates that various modifications and changes can be made without departing from the scope of the present invention as set forth in the claims below. Accordingly, the specification is to be regarded in an illustrative, rather than a restrictive sense, and all such modifications are intended to be included within the scope of the present invention.

Benefits, other advantages, and solutions to problems have been described above with regard to specific embodiments; however, the benefits, advantages, solutions to problems, and any element(s) that may cause any benefit, advantage, or solution to occur or become more pronounced are not to be construed as a critical, required, or essential feature or element of any or all of the claims.

As used herein, the terms "comprises," "comprising," "includes," "including," "has," "having," "at least one of," or any other variation thereof, are intended to cover a non-exclusive inclusion. For example, a process, method, article, or apparatus that comprises a list of elements is not necessarily limited only to those elements, but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A method comprising:
providing a fluid cementitious mix of approximately zero slump comprising aggregate;
providing a first pump for receiving the fluid cementitious mix and pumping the fluid cementitious mix; providing a liquid admixture; providing a second pump for receiving the liquid admixture and pumping the liquid admixture;
providing a controller connected with the first pump and with the second pump for controlling the flow of the fluid cementitious mix and controlling the flow of the liquid admixture so as to maintain a proportional ratio of the liquid admixture to the fluid cementitious mix;
providing an injector having at least one orifice for providing the liquid admixture to the fluid cementitious mix;
and providing an inline mixer coupled to the first pump to receive a flow of the cementitious mix and coupled to the second pump through the injector to receive a flow of the liquid admixture to accomplish substantially homogeneous mixing of the cementitious mix and the liquid admixture:
the inline mixer comprising:
a casing with a casing inlet port for receiving a fluid cementitious mix, and a casing exit port; the inline mixer having a plurality of mixing vanes, each of the mixing vanes projecting from the periphery of the casing with a combined angle of twist and slope to direct the liquid admixture flow away from the periphery of the casing; the inline mixer having the plurality of mixing vanes disposed in an axially spaced and circumferentially staggered orientation, wherein the fluid cementitious mix and liquid admixture engages the mixing vanes sequentially, facilitating the passage of the fluid cementitious mix through the casing and to avoid blockages;
pumping the fluid cementitious mix of approximately zero slump with the liquid admixture into place without using pneumatic assistance or pressurized gas introduction into the fluid cementitious mix to create a vertical or sloped surface.

2. The method of claim 1, wherein the second pump is run at a rate controlled proportionally to a rate of the first pump and by a system that controls the rate of the first pump.

3. The method of claim 1, further comprising providing a flow meter for the flow rate of the fluid cementitious mix so as to determine a proportional rate of pumping for the liquid admixture.

4. The method of claim 1, wherein each vane of the plurality of mixing vanes is removably attached to the casing, so that each vane can be replaced, and so the projection of each vane into the inline mixer can be adjusted.

5. The method of claim 1, wherein said at least one orifice of the injector is aligned with one vane in the direction of the fluid cementitious mix flow so that the admixture is directed at the vane in order to be directed away from the casing for a more effective dispersion into the fluid cementitious mix.

6. The method of claim 1, further comprising providing a screed disposed and guided so as to define a vertical surface of a cast in-situ wall of the fluid cementitious mix with the liquid admixture.

7. The method of claim 1, wherein the liquid admixture imparts a thixotropic rheology to the fluid cementitious mix and has a thickening action with an amount of shear thinning so that the fluid cementitious mix with the liquid admix can be stacked vertically and vibrationally consolidated.

8. The method of claim 1, wherein the fluid cementitious mix has a pH of 8 or higher, the liquid admixture includes at least one liquid thickening agent that is pH activated so that upon introduction of the liquid admixture to the fluid cementitious mix having a pH of 8 or higher, the liquid admixture activates to thicken the fluid cementitious mix.

9. The method of claim 1, wherein the fluid cementitious mix comprises water, the liquid admixture comprises a non-water liquid carrier and a water-reactive thickening agent; wherein a thickening action of the water-reactive thickening agent is prevented until the water-reactive thickening agent comes into contact with the water in the fluid cementitious mix.

10. The method of claim 1, wherein the liquid admixture comprises a non-water liquid carrier so as to delay a thickening effect of the cementitious mix.

11. The method of claim 1, wherein the liquid admixture comprises a sulfate salt so as to induce a false set of the cementitious mix.

12. The method of claim 1, wherein the liquid admixture comprises a aluminum sulfate, calcium sulfate, or combinations thereof so as to induce a false set of the cementitious mix.

13. The method of claim 1, further comprising providing a plurality of preplaced reinforcing elements and using the liquid admixture to impart a thixotropic rheology to the fluid cementitious mix and a thickening action with an amount of shear thinning to the fluid cementitious mix with the liquid admixture, and casting a wall in-situ using the fluid cementitious mix with the liquid admixture with the plurality of preplaced reinforcing elements to reinforce the wall.

14. The method of claim 1, wherein at least one of the vanes of the inline mixer has at least one vane that can be adjusted to project further into the inline mixer than is the maximum width of the vane.

15. The method of claim 1, wherein the liquid admixture comprises: liquid defoaming agent, wetting agent, alkyl polysaccharide ether, hydroxyalkyl polysaccharide ether, alkyl hydroxyalkyl polysaccharide ether, cellulose ether, starch ether, guar ether, alkyl, hydroxyalkyl, alkylene, synthetic polysaccharide, heteropolysaccharide, xanthan gum, wellan gum, cellulose fiber, dispersing agent, cement superplasticizer, setting accelerator, early strength accelerator, setting retarder, air entrainer, polycarboxylate, polycarboxylate ether, polyacrylamide, modified polyvinyl alcohol, polyvinyl pyrrolidone, polyalkylene oxide, polyalkylene glycol, block copolymer, foam forming dispersion powder redispersible in water, vinyl acetate, ethylene vinyl acetate, ethylene vinyl acetate vinyl versatate, ethylene vinyl acetate (meth)acrylate, ethylene vinyl acetate vinyl chloride, vinyl acetate vinyl versatate, vinyl acetate vinyl versatate (meth)acrylate, vinyl versatate (meth)acrylate, all (meth)acrylate, styrene acrylate, styrene butadiene, hydrophobing agents, silanes, silane esters, siloxanes, silicones, fatty acids, fatty acid esters, thickening agents, quartzite, carbonaceous sands, quartz sand, limestone, carbonates, silicates, layer silicates, precipitated silicic acid, fillers, hollow microspheres of glass, polymers, polystyrene spheres, aluminosilicate, silicon oxide, aluminum silicon oxide, calcium silicate hydrate, silicon dioxide, aluminum silicate, magnesium silicate, aluminum silicate hydrate, calcium aluminum silicate, calcium silicate hydrate, aluminum iron magnesium silicate, calcium metasilicate, volcanic slag, pozzolanic materials, metakaolin, latent hydraulic components, polysaccharides and polysaccharide ethers, cellulose ethers, starch ethers, amylase, amylopectin, amylase derivatives, amylopectin derivatives, guar ethers, dextrins, polysaccharides, polysaccharide derivatives, alginates, peptides, proteins, dextrins, starch, starch ethers, casein, soya protein, hydroxyalkyl cellulose, alkyl hydroxyalkyl cellulose, methylcellulose, hydroxypropyl methylcellulose, vinyl acetate-ethylene copolymer (VAE), poly vinyl alcohol (PVOH) or poly vinyl acetate (PVA), aluminum sulfate, diethanolamine, triethanolamine, gypsum, plaster of paris, calcium sulfate hemihydrate, poly-acrylic acid sodium salt, polyacrylamide copolymer, ethylene maleic anhydride copolymer, cross-linked carboxymethylcellulose, polyvinyl alcohol copolymers, cross-linked polyethylene oxide, clay, attapulgite, palygorskite, sepeolite, kaolin, metakaolin, bentonite, magnesium aluminum-silicate, starch grafted copolymer of polyacrylonitrile, carbohydrate starch ether disbursible powders, starches of arrowroot, starches of corn, starches of katakuri, starches of potato, starches of sago, starches of cassava, or combinations thereof.

16. The method of claim 1, wherein the controller comprises a first controller connected with the first pump and a second controller connected with the second pump.

17. A method comprising:
providing a fluid cementitious mix of approximately zero slump comprising aggregate;
providing a liquid admixture;
providing a first pump receiving a flow of the fluid cementitious mix;
providing a length of a pressurized conduit connected to the first pump, through which the fluid cementitious mix is conveyed;
providing an inline mixer connected with the pressurized conduit;
adding by pressurized injection to the pressurized conduit or to the inline mixer an effective amount of the liquid admixture, the liquid admixture having an effective composition to thicken the fluid cementitious mix; allowing intermixing of the liquid admixture with the fluid cementitious mix within the inline mixer so as to accomplish disruption of the liquid admixture flow away from the periphery of the pressurized conduit with a plurality of mixing vanes,
each of the mixing vanes projecting from the periphery of the inline mixer with a combined angle of twist and slope serving to direct the admixture flow away from the periphery of the pressurized conduit flow; having the vanes of the plurality of mixing vanes effectively spaced axially and in a random pattern or a circumferentially staggered pattern along the inline mixer,
wherein the fluid cementitious mix sequentially engages one or more of the mixing vanes, the sequentially engages one or more of the mixing vanes facilitates the passage of the fluid cementitious mix through the inline mixer and to avoid blockages;
and using the pump and the pressurized conduit to pump the fluid cementitious mix of approximately zero slump with the liquid admixture as it is expelled from the end of the pressurized conduit to cast a vertical surface of a cementitious structure without using pneumatic assistance or pressurized gas introduction into the fluid cementitious mix.

18. The method of claim 17, further comprising using a guide member while placing the fluid cementitious mix with the liquid admixture with increasing vertical dimension and to define a finished surface of the cementitious structure.

19. The method of claim 18, wherein the vertical guide member provides temporary confinement to the fluid cementitious mix while vibration is applied, allowing further consolidation to the fluid cementitious mix.

20. The method of claim 17, further comprising controlling the flow rate of the liquid admixture at a rate proportional to the flow rate of fluid cementitious mix.

21. The method of claim 17, wherein the liquid admixture includes at least one cement accelerator.

\* \* \* \* \*